US012492696B2

(12) United States Patent
Hayes et al.

(10) Patent No.: US 12,492,696 B2
(45) Date of Patent: Dec. 9, 2025

(54) INLINE LANDFILL PUMP CYCLE COUNTER

(71) Applicant: Q.E.D. Environmental Systems, Inc., Dexter, MI (US)

(72) Inventors: Daniel O. Hayes, Howell, MI (US); Michael K. Lindquist, Plymouth, MI (US)

(73) Assignee: Graco Minnesota Inc., Minneapolis, MN (US)

( * ) Notice: Subject to any disclaimer, the term of this patent is extended or adjusted under 35 U.S.C. 154(b) by 196 days.

(21) Appl. No.: 18/082,365

(22) Filed: Dec. 15, 2022

(65) Prior Publication Data

US 2023/0193895 A1 Jun. 22, 2023

Related U.S. Application Data

(60) Provisional application No. 63/291,527, filed on Dec. 20, 2021.

(51) Int. Cl.
*F04B 49/03* (2006.01)
(52) U.S. Cl.
CPC .... *F04B 49/03* (2013.01); *F04B 2201/02071* (2013.01)
(58) Field of Classification Search
CPC ............ F04B 49/03; F04B 2201/0207
See application file for complete search history.

(56) References Cited

U.S. PATENT DOCUMENTS

| 2,900,999 | A | * | 8/1959 | Courtot ................... F16K 17/04 137/543.13 |
| 3,937,083 | A | | 2/1976 | Sabatino et al. |
| 4,570,665 | A | * | 2/1986 | Zimmerly ............... F16K 41/02 251/324 |
| 5,517,008 | A | | 5/1996 | Francart |
| 5,549,157 | A | * | 8/1996 | Johnson ................... F04F 1/08 166/107 |
| 6,132,176 | A | | 10/2000 | Higgins |
| 6,439,856 | B1 | | 8/2002 | Ivey |
| 7,004,728 | B2 | | 2/2006 | Soares |
| 9,476,419 | B2 | | 10/2016 | Estelle |
| 10,941,762 | B2 | | 3/2021 | Zientara et al. |
| 2018/0058595 | A1 | * | 3/2018 | Grayson ................. F16K 17/04 |
| 2020/0263706 | A1 | * | 8/2020 | Wells ........................ F04F 1/06 |
| 2020/0334515 | A1 | | 10/2020 | Schaupp et al. |

* cited by examiner

*Primary Examiner* — Connor J Tremarche
(74) *Attorney, Agent, or Firm* — Kinney & Lange, P.A.

(57) ABSTRACT

A landfill pump cycle counter includes a housing defining an internal passage, a poppet disposed within the internal passage, a magnet disposed within an internal cavity of the poppet, a counter, a seat formed on an inner surface of the housing, and a mating surface formed on the poppet. The landfill pump cycle counter is configured to receive liquid output from a landfill pump. The housing extends along an axis and also defines an inlet and an outlet. The internal passage fluidly connects the inlet to the outlet. The poppet is configured to be moved axially between an open state and a closed state. The counter includes a magnetic sensor configured to detect a poppet cycle. The poppet cycle includes the poppet moving from one of the open state and the closed state to the other of the open state and the closed state.

21 Claims, 10 Drawing Sheets

INLINE LANDFILL PUMP CYCLE COUNTER

CROSS-REFERENCE TO RELATED APPLICATION(S)

This application claims the benefit of U.S. Provisional Application No. 63/291,527 filed Dec. 20, 2021 for "INLINE LANDFILL PUMP CYCLE COUNTER" by D. Hayes, the disclosure of which is hereby incorporated by reference in its entirety.

BACKGROUND

The present disclosure relates to landfill well pumps, and more particularly to counters for counting pump cycles of landfill well pumps.

Landfill well pumps can be used to remove leachate from landfill wells. Landfill well pumps are often located in remote areas and are configured to automatically pump leachate materials. A cycle counter can be used to count the number of pumping cycles by the pump, a pump cycle occurring when the pump activates to pump the liquid from the well and then deactivates after pumping the liquid. The number of pump cycles performed by a landfill pump can be used to assess maintenance or replacement needs, or can be used for other purposes. The number of cycles of the submerged landfill pump can relate important information, such as the total quantity of liquid removed from a well as well as the rate of removal, and can confirm that the submerged landfill pump is operating. Accurate counting of cycles is important for accurate pumping information. Some cycle counter designs for pneumatic landfill well pumps can be placed in-line with the supply of compressed air for operating the landfill well pump.

SUMMARY

According to one aspect of the present disclosure, an example of a landfill pump cycle counter includes a housing defining an internal passage, a poppet disposed within the internal passage, a magnet disposed within an internal cavity of the poppet, a counter, a seat, and a mating surface. The landfill pump cycle counter is configured to receive liquid output from a landfill pump. The housing extends along an axis and also defines an inlet and an outlet. The internal passage fluidly connects the inlet to the outlet. The poppet is configured to be moved axially between an open state and a closed state. The counter includes a magnetic sensor configured to detect a poppet cycle. The poppet cycle includes the poppet moving from one of the open state and the closed state to the other of the open state and the closed state. The seat is formed on an inner surface of the housing and the mating surface is formed on the poppet and is configured to form a first mating interface with the seat of the housing when the poppet is in the closed state.

According to an additional or alternative aspect of the present disclosure, an example of a landfill pump system includes a pneumatic landfill pump, an air source pneumatically connected to the pneumatic landfill pump, and a landfill pump cycle counter according to another aspect of the present disclosure. The pneumatic landfill pump is configured to be at least partially submerged in a landfill well and to pump liquid from the landfill well along an evacuation line fluidly connected to the pneumatic landfill pump. The air source configured to supply compressed air to the pneumatic landfill pump to cause pumping by the pneumatic landfill pump. The landfill pump cycle counter is connected to the evacuation line, such that the landfill pump cycle counter receives the liquid pumped through the evacuation line by the pneumatic landfill pump.

According to another additional or alternative aspect of the present disclosure, a method of counting landfill pump cycles includes pumping liquid from a landfill pump to a landfill pump cycle counter, moving a poppet of the landfill pump cycle counter from a closed state to an open state with the flow of liquid, wherein the poppet includes a magnet, and detecting that the poppet has moved from the closed state to the open state with a magnetic sensor configured to detect a magnetic field of the magnet. The method further includes stopping the flow of liquid from the landfill pump to the landfill pump cycle counter, moving the poppet of the landfill pump cycle counter from the open state to the closed state with a spring, detecting that the poppet has moved from the open state back to the closed state with the magnetic sensor, and incrementing a cycle count by the landfill pump cycle counter after the poppet has moved from the open state back to the closed state.

DETAILED DESCRIPTION

The present disclosure describes various examples of landfill pump cycle counters for use along an evacuation line of a landfill pump system using a pneumatic pump. More specifically, the landfill pump cycle counters disclosed herein are designed to determine count the operational cycles of a landfill pump based on the presence or absence of flow of landfill well liquid from a landfill well. As will be explained in more detail subsequently, existing landfill pump cycle counters are configured to count pump cycles based on the flow of compressed air to a pneumatic landfill pump. The designs disclosed herein, conversely, count pump cycles based on the flow of landfill liquid out of the landfill pump. While the example of pumping water from a landfill well will be used herein, it will be understood that the water could be any type of liquid which accumulates in a landfill well. Indeed, the water may include leachate or other contaminants. In other examples, the landfill pump cycle counters can be adapted to count pump cycles other systems and/or non-landfill applications.

Counting pump cycle based on the flow of landfill liquid rather than the flow of compressed air can advantageously reduce overcounting. However, landfill liquid contains contaminants that are highly corrosive and can accumulate along inner surfaces of existing landfill counter designs when placed in a flow of liquid, potentially clogging or otherwise damaging components of the landfill pump cycle counter. Advantageously, the landfill pump cycle counters described herein include various shapes, contours, chamfers, and other elements configured and structured to reduce contaminant accumulation along the interior of the landfill pump cycle counter during operation while providing accurate cycle counting. Further, the landfill pump cycle counters described herein can also be formed of various anti-corrosive materials, such as stainless steel materials, to reduce corrosion-based wear from exposure to leachate in landfill well liquids, which can be substantially corrosive to conventional landfill pump cycle counters.

Figure 1:
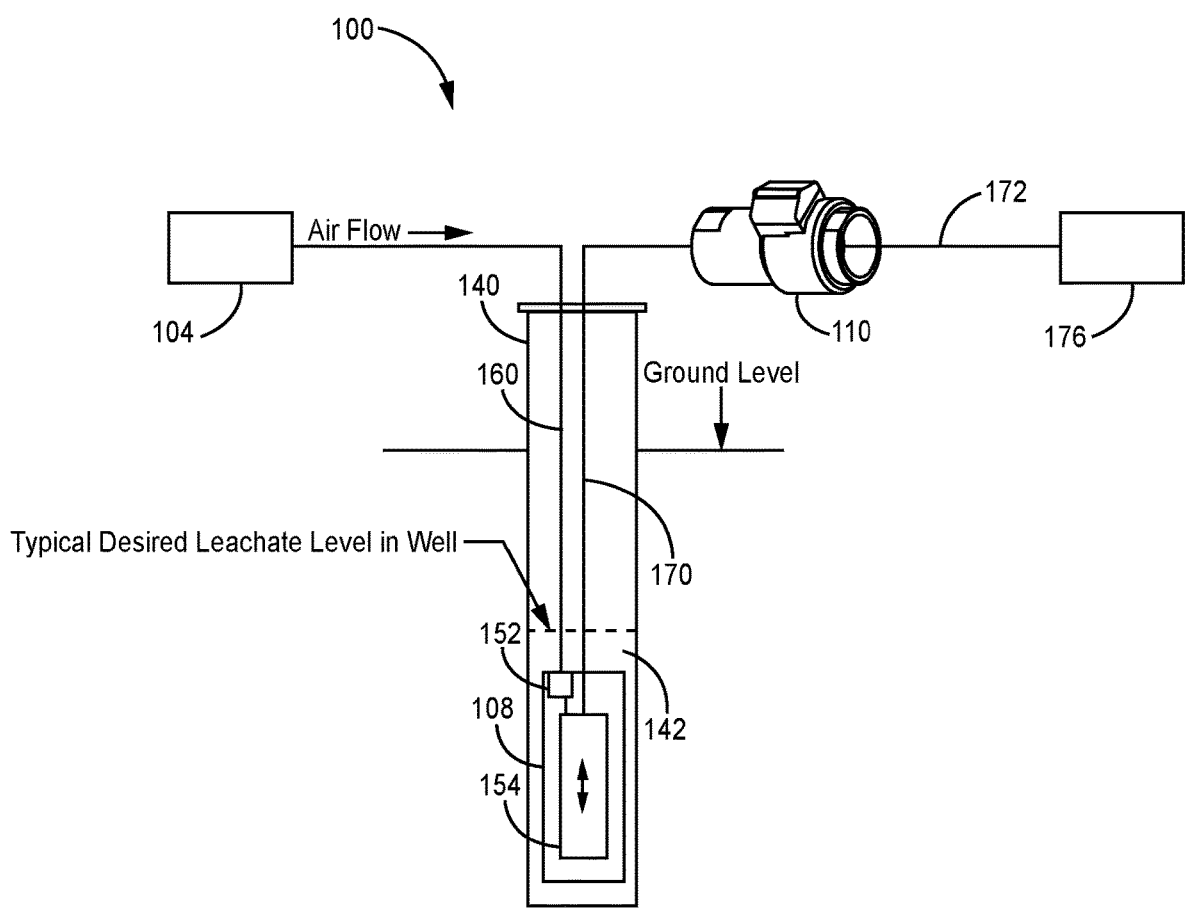
FIG. 1 is a schematic diagram of an example of a landfill pump system.

FIG. 1 is a schematic diagram of landfill pump system 100. Landfill pump system 100 includes compressed gas source 104, landfill pump 108, and pump cycle counter 110. Landfill pump 108 is submerged in landfill well 140 and is configured to pump landfill liquid 142. Landfill pump 108 includes valve 152 and float 154. Landfill pump 108 is connected to compressed gas source 104 via pneumatic line 160 and to pump cycle counter 110 and downstream location 176 via evacuation line 170. Evacuation line 170 carries liquid from landfill pump 108 to a downstream location 176. In some examples, the downstream location 176 can be a treatment facility, storage container, or other location downstream of pump 108.

Landfill well 140 is a landfill well formed within a landfill site and passively collects liquid 142 from the landfill site. Landfill well 140 is a bore into the ground, typically with casement. Landfill pump 108 is submersible and during operation can be submerged within liquid 142 within landfill well 140. Landfill pump 108 is a pneumatic pump that pumps liquid 142 out of landfill well 140. Liquid 142 is a landfill well liquid and in some examples can be referred to as a "leachate." Float 154 is buoyant and is disposed within an interior pump chamber of landfill pump 108, such that increased liquid level within the interior pump chamber causes float 154 to rise within the interior pump chamber. Float 154 can be mechanically linked to valve 152 to actuate valve 152, or one or more electrical components, such as one or both of a sensor and electric actuator, can actuate valve 152 based on the position of the float 154. When valve 152 is actuated to the open position, compressed gas flows from compressed gas source 104 to the interior pump chamber of landfill pump 108. The open position of valve 152 corresponds to the pump phase of landfill pump 108. When valve 152 is actuated to the closed position, compressed gas from compressed gas source 104 does not flow to the interior pump chamber of landfill pump 108. The closed position of valve 152 corresponds to the dwell phase of landfill pump 108. In some examples, the dwell phase can be referred to as the "fill phase." Compressed gas source 104 can be any suitable source of pressurized gas, such as a pressurized gas tank or a compressor. The compressed gas can be any suitable inert gas, such as atmospheric air, diatomic nitrogen, and/or a noble gas, among other options.

In operation, liquid 142 within landfill well 140 fills the interior pump chamber of landfill pump 108, increasing the liquid level within landfill pump 108. The increased liquid causes float 154 to rise. After float 154 has moved a threshold distance or to a threshold position, valve 152 is actuated to the open position such that landfill pump 108 is in the pump phase, allowing compressed gas to flow from compressed gas source 104 along pneumatic line 160. The compressed gas that flows along pneumatic line 160 and through valve 152 flows into the internal chamber of landfill pump 108, forcing liquid 142 to flow through evacuation line 170. The expelled liquid 142 is typically routed above ground to downstream location 176 (e.g., a treatment facility, a reservoir, and/or to an analyzer (i.e., an analyzer for testing liquid 142)). After discharging the expelled liquid 142, float 154 moves downward, actuating valve 152 to close such that landfill pump 108 is in the dwell phase. Actuating valve 152 to close prevents compressed gas from compressed gas source 104 from entering the interior of landfill pump 108, such that landfill pump 108 can accumulate liquid 142 until float 154 rises to the threshold position for actuating valve 152 to the open position. Accordingly, landfill pump 108 periodically cycles through the pump and dwell phases according to the position of float 154/the level of liquid 142.

Pump cycle counter 110 is attached to along evacuation line 170 such that liquid 142 flows through pump cycle counter 110 before flowing to the downstream location 176. Evacuation line 170 is configured to flow landfill well liquid and are substantially similar. Pump cycle counter 110 is configured to detect the flow of liquid 142 through evacuation line 170. Specifically, pump cycle counter 110 is configured to detect the presence and absence of flow of liquid 142. As liquid 142 flows when landfill pump 108 is in the pump phase and does not flow when landfill pump 108 is in the dwell phase, the flow of liquid 142 can be used as indicia to count the pump cycles of landfill pump 108.

Pump cycle counter 110 can be used to count the number of pump cycles performed by landfill pump 108 over an extended period of time. The pump cycle count that is measured by pump cycle counter 110 can represent the operational lifetime of landfill pump 108 and can be used to determine, for example, whether landfill pump 108 or another component of landfill pump system 100 requires maintenance or replacement.

In some examples, the pump cycle counter 110 does not regulate the flow liquid 142. Rather, in these embodiments, the pump cycle counter 110 passively responds to the flow of liquid 142 to count pump cycles of landfill pump 108.

Existing landfill pump cycle counters and landfill pump systems determine the pump cycle of the landfill pump by measuring the flow of compressed gas along pneumatic line 160. However, pneumatic line 160 remains charged during the dwell cycle of landfill pump 108. The volume of gas in the charged pneumatic line 160 can expand and contract when the landfill pump is in the dwell cycle, leading to erroneous double or additional counts of pump cycle. Advantageously, pump cycle counter 110 is disposed along evacuation line 170, which does not remain charged/pressurized while landfill pump 108 is in the dwell cycle. As such, the position of pump cycle counter 110 improves the accuracy of the pump cycle count.

Further, existing landfill pump cycle counters are not configured or structured to be positioned along evacuation line 170. Liquid 142 often includes sediments and other non-liquid masses that can clog existing landfill pump cycle counters. Further, liquid 142 also can include corrosive or toxic materials that can corrode or otherwise damage the physical components of existing landfill pump cycle counters. Placing an existing landfill pump cycle counter along evacuation line 170 such that liquid 142 flows through the existing landfill pump cycle counter can therefore also lead to erroneous pump cycle counts and, further, can increase maintenance costs associated with replacing corroded and/or damaged counters according to existing designs.

FIGS. 2-6 depict example landfill pump cycle counters that are structured and configured to be used along evacuation line 170 as pump cycle counter 110. The landfill pump cycle counters depicted in FIGS. 2-5 are configured to inhibit buildup of contaminants and, in some examples, can be formed of corrosion-resistant materials.

Figure 2:
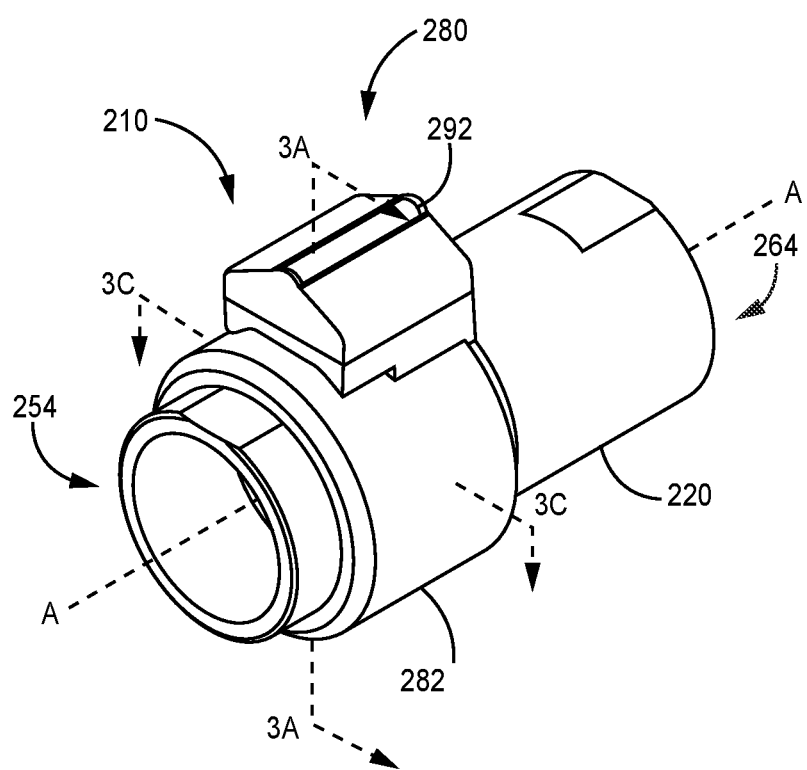
FIG. 2 is an isometric view of an example of a landfill pump cycle counter.
Figure 3A:
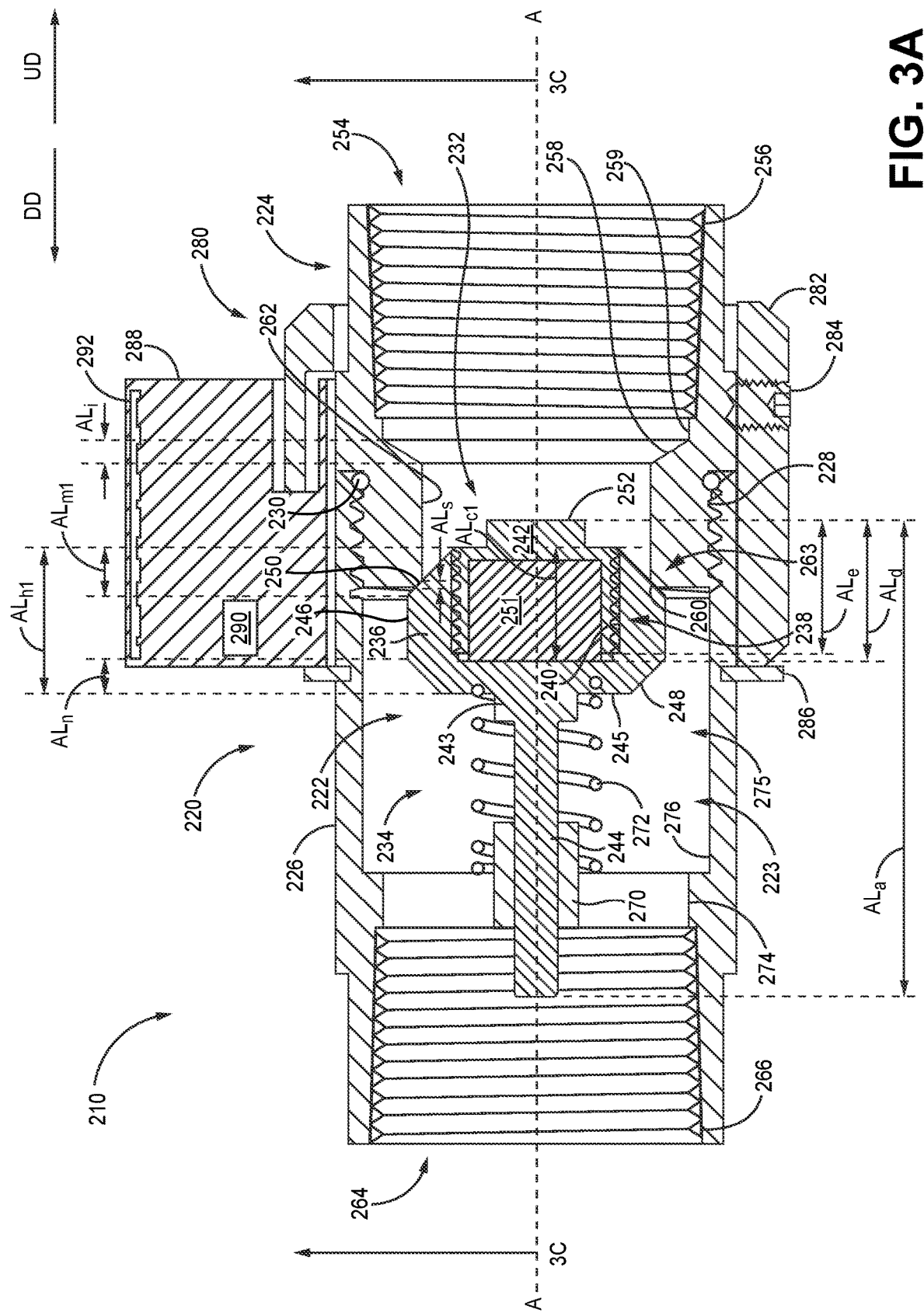
FIG. 3A is a cross-sectional view of the of the landfill pump cycle counter of FIG. 2 taken along line 3A-3A in FIG. 2.
Figure 3B:
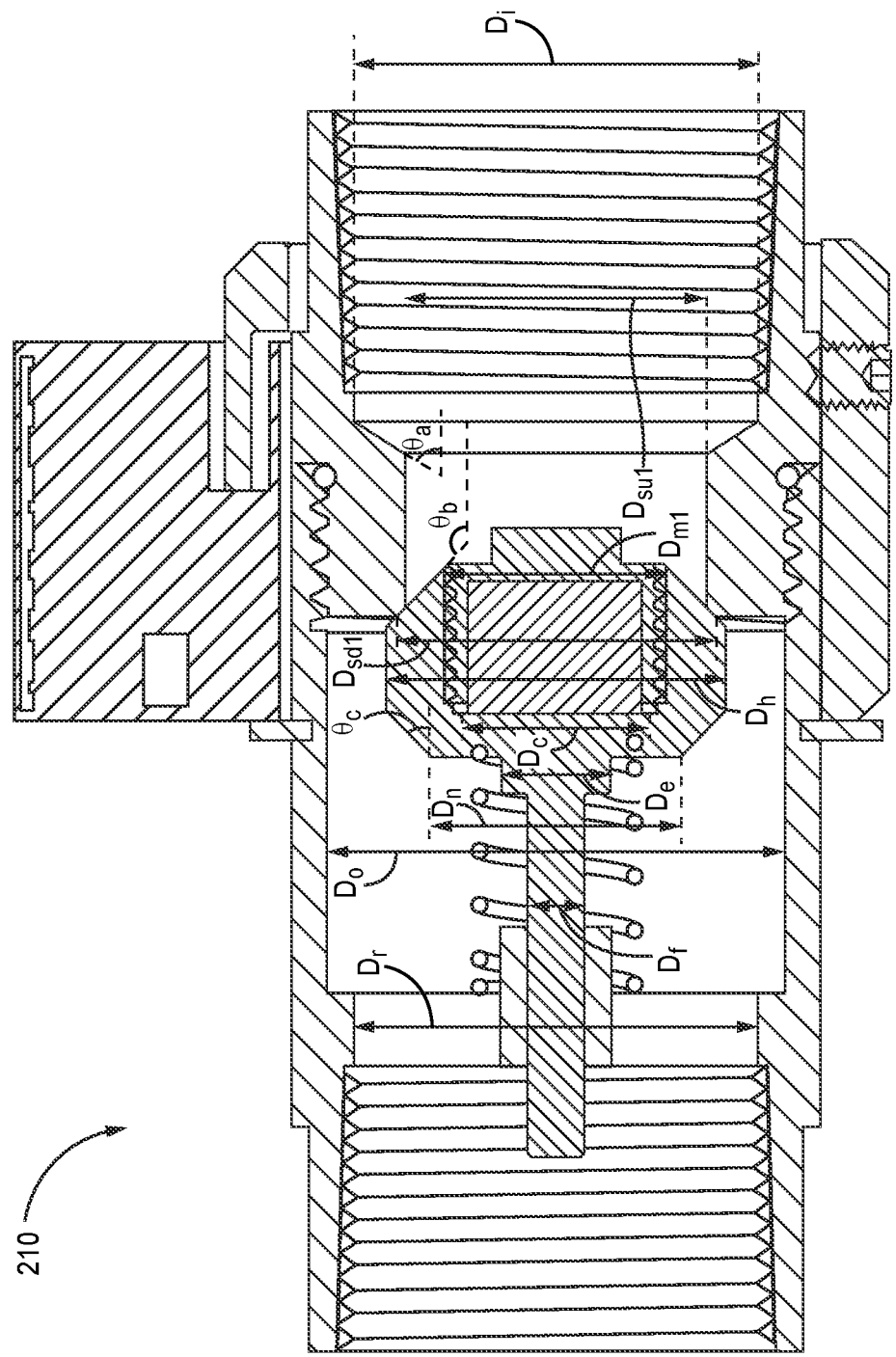
FIG. 3B is the cross-sectional view of the of the landfill pump cycle counter of FIG. 3A including labels not included in FIG. 3A for clarity.
Figure 3C:
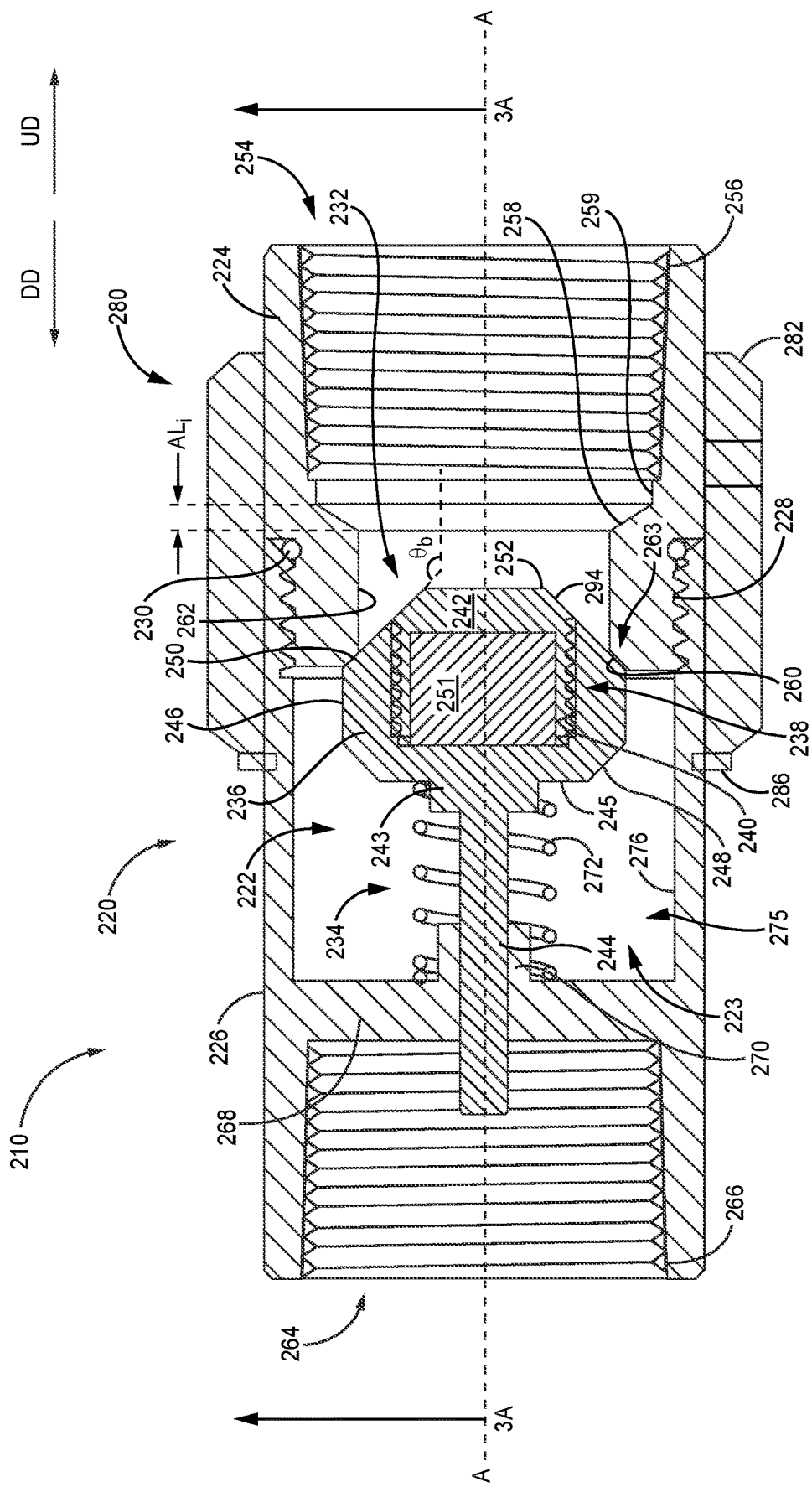
FIG. 3C is a cross-sectional view of the of the landfill pump cycle counter of FIGS. 2-3B taken along line 3C-3C in FIG. 2.

FIGS. 2-3C depict pump cycle counter 210, which is one example of a landfill pump cycle counter suitable for use as pump cycle counter 110 along evacuation line 170. Pump cycle counter 210 is configured to inhibit leachate buildup on the interior components of pump cycle counter 210 while providing accurate cycle counts for a landfill pump. FIG. 2 is an isometric view of pump cycle counter 210, which is one example of a landfill pump cycle counter suitable for use as pump cycle counter 110 along evacuation line 170 (FIG. 1). FIGS. 3A and 3B are cross-sectional views of pump cycle counter 210 taken along line 3A-3A shown in FIG. 2. FIGS. 3A and 3B show the same view of pump cycle counter 210, but are labeled differently for clarity. FIG. 3C is a cross-sectional view of landfill pump cycle counter taken along line 3C-3C. FIGS. 2-3C will be discussed together herein.

Pump cycle counter 210 includes housing assembly 220 and poppet assembly 222. Housing assembly 220 defines internal passage 223 and includes inlet housing 224, outlet housing 226, threaded interface 228, and seal 230. Poppet assembly 222 includes head assembly 232 and guide 234. Head assembly 232 includes head 236, cavity 238, inner surface 240, cap 242, and magnet 251. Guide 234 includes neck 243 and stem 244. Head 236 includes downstream end 245, outer surface 246, downstream poppet chamfer 248, and mating surface 250. Cap 242 includes tool interface 252. Inlet housing 224 defines inlet 254 and includes screw threading 256, inlet chamfer 258, inlet shoulder 259, seat 260, and inlet throat 262. Mating interface 263 is formed between mating surface 250 and seat 260. Outlet housing 226 defines outlet 264 and includes screw threading 266, poppet support 268, poppet receiver 270, spring 272, outlet rib 274, downstream chamber 275, and chamber wall 276. Counter assembly 280 is mounted on housing assembly 222 and includes collar 282, set screw 284, annular tab 286, sensor housing 288, magnetic sensor 290, and display 292.

Liquid discharged from a landfill pump (e.g. landfill liquid 142 discharged from landfill pump 108) is able to flow through internal passage 223 from inlet 254 to outlet 264, defining a flow direction that is substantially parallel to axis A-A, including upstream direction UD, against the flow, and downstream direction DD, with the flow. The axis of internal passage 223 is substantially coaxial with axis A-A in the depicted example, though it is understood that in other examples, internal passage 223 can adopt other configurations (e.g., bent, curved, etc.). Axis A-A can be considered to form a flow axis in the depicted example.

Poppet assembly 222 includes head assembly 232 and guide 234. Head assembly 232 includes head 236 and cap 242. Head 236 includes downstream end 245, which extends radially outward from the upstream end of guide 234, and outer surface 246, which is an annular structure that extends in the upstream direction UD relative to downstream end 245. Outer surface 246 is formed as a cylinder that extends that is centered on and extends axially along axis A-A between mating surface 250 and downstream poppet chamfer 248.

Downstream poppet chamfer 248 is sloped inwardly with respect to downstream direction DD and is formed on the downstream end of head 236 and extends between downstream end 245 and outer surface 246. Poppet chamfer 248 reduces the diameter of head assembly 232 from outer surface 246 to the downstream end 245. Poppet chamfer 248 can be an annular sloped surface and can be considered a frustoconical surface. Downstream poppet chamfer 248 is sloped to reduce the turbulence of flow of the liquid over head 236 and downstream beyond head 236. The sloped poppet chamfer 248 does not include sharp corners that can create locations for contaminants to accumulate. Advantageously, reducing the turbulence of the flow can also reduce contaminate precipitation along the internal surfaces of pump cycle counter 210, including downstream poppet chamfer 248.

Mating surface 250 slopes outwardly with respect to downstream direction DD and is formed on the upstream end of outer surface 246 of head 236. The specific dimensions and angles of downstream poppet chamfer 248 and mating surface 250 are discussed subsequently. Poppet assembly 222 is centered on and actuates or translates along a poppet axis. In the depicted example, the poppet axis of poppet assembly 222 is coaxial with axis A-A. The sloped structure of mating surface 250 reduces the turbulence of liquid flow over head 236 and downstream over head 236. Further, the sloped structure mating surface 250 does not include sharp corners that can create locations for contaminants to accumulate. Mating surface 250 is an annular sloped surface and can be considered a frustoconical surface.

Head 236 includes a hollow, such that the inner surface 240 of head 236 defines cavity 238. Cavity 238 is substantially cylindrical and has upstream and downstream ends. The upstream end of cavity 238 is open (i.e., open to internal passage 223) and the downstream end of cavity 238 is closed (i.e., closed to flow from internal passage 223 by downstream end 245 of head 236). Cavity 238 is sized to receive magnet 251 and cap 242. Head assembly 232 is assembled by inserting magnet 251 into cavity 238 and by subsequently attaching cap 242 to head 236 or by inserting magnet 251 into cap 242 and subsequently attaching the assembled magnet 251 and cap 242 to head 236. Cap 242 covers the upstream opening of cavity 238 and reduces or prevents ingress of liquid into cavity 238 during operation of pump cycle counter 210.

Advantageously, inhibiting liquid flow into cavity 238 during operation of pump cycle counter 210 prevents buildup of leachate on poppet head 236 and prevents corrosion of magnet 251. In the depicted example, cap 242 includes a radially-extending portion that covers the opening of cavity 238 and an axially-extending portion that attaches to the inner surface of cavity 238. In the depicted example, cap 242 is attached to cavity 238 by a threaded interface, but in other examples, other attachment types can be used, such as press-fit, bayonet style, etc. Cap 242 includes tool interface 252, which can allow a tool, such as a wrench or screwdriver, to interface with cap 242 to screw cap 242 onto head 236 during assembly of poppet assembly 222. As shown in FIG. 3C, cap 242 can include cap chamfer 294, which is oriented in an upstream direction UD.

Cap chamfer 294 provides a smooth transition along the exterior of cap 242 from the upstream-most end of cap 242 and towards the body of head 236. Cap chamfer 294 eliminates sharp corners to inhibit contaminant accumulation along cap 242 during operation of pump cycle counter 210. Cap chamfer 294 slopes according to angle $\theta_b$ in the depicted example, but in other examples, cap chamfer 294 can slope according to another suitable angle. The upstream and downstream diameters of cap chamfer 294 as well as the axial length of cap chamfer 294 can be selected based on the desired angle of cap chamfer 294 relative to axis A-A. Cap chamfer 294 can be an annular sloped surface and can be considered a frustoconical surface.

Guide 234 includes neck 243 and stem 244. Neck 243 extends in downstream direction DD from the downstream end of head 236. Neck 243 can be formed monolithically with head 236 or formed separately from head 236 and attached to head 236. Neck 243 projects and can extend into spring 272. Neck 243 is shaped and sized to prevent radial translation of spring 272 during operation, centering spring 272.

Stem 244 extends in downstream direction DD from the downstream end of neck 243 and is received by poppet receiver 270. Stem 244 is axially elongate. Stem 44 can be shaped as an elongate cylinder and functions to prevent radial translation of poppet assembly 222 during operation of pump cycle counter 210 while allowing axial translation of poppet assembly 222 between open and closed states. While stem 244 is shown as cylindrical, it is understood that stem 244 can have any desired cross-sectional shape orthogonal to axis AA suitable for interfacing with the opening through receiver 270. In the example shown, stem 244 has a smaller diameter than neck 243. Neck 243 has a smaller diameter than head 436 when taken at outer surface 246.

As will be discussed in more detail subsequently, the open state of poppet assembly 222 allows liquid to flow past poppet assembly 222 and the closed state of poppet 222 prevents flow of liquid past poppet assembly 222. Pump cycle counter 210 is structured and configured to allow poppet assembly 222 to between the open state and the closed state along the axis AA.

Inlet housing 224 includes screw threading 256, inlet chamfer 258, inlet shoulder 259, seat 260, and inlet throat 262. Inlet housing 224 is attached to outlet housing 226 to form housing assembly 220. In the example shown, inlet housing 224 is attached to outlet housing 226 via threaded interface 228, though it is understood that other connection types are possible. Seal 230 is located on an upstream end of threaded interface 228 exterior to internal passage 223 and functions to prevent leakage of liquid during operation of pump cycle counter 210. For example, seal 230 can be an elastomer seal, such as an O-ring seal, among other options. Placing seal 230 outside of internal passage 223 rather than, for example, on a downstream end of threaded interface exposed to internal passage 223 reduces the likelihood of contaminant accumulation along seal 230, though it is understood that in other examples inlet housing 224 and/or outlet housing 226 can include a recessed seat or other smoothing features to allow seal 230 to be placed adjacent to internal passage 223 without increasing contaminant accumulation along seal 230.

Inlet 254 is formed on an upstream end of inlet housing 224 and allows flow of liquid into internal passage 223. Similarly, outlet 264 is formed on a downstream end of outlet housing 226 and allows flow of liquid out of internal passage 223. Inlet 254 includes screw threading 256, which can be used to attach inlet housing 224 to the upstream portion of evacuation line 170 (FIG. 1) or another suitable structure or apparatus for delivering a flow of landfill well liquid to pump cycle counter 210. Outlet 264 includes screw threading 266, which can be used to attach outlet housing 226 to the downstream portion of evacuation line 170 (FIG. 1) or another suitable structure or apparatus for delivering the flow of liquid 142 to the downstream location 176. The portion of evacuation line 170 attached to inlet housing 224 can include screw threading for interfacing with screw threading 256. Similarly, the portion of evacuation line 170 attached to outlet housing 226 can include screw threading for interfacing with screw threading 266. When pump cycle counter 210 is installed along evacuation line 170, the upstream portion of evacuation line 170 can extend into inlet housing 224 to abut the upstream end of inlet shoulder 259 and the downstream portion of evacuation line 170 can extend into outlet housing 226 to abut the downstream end of outlet rib 274. In some examples, the interface between screw threading 256, 266 and screw threading of evacuation lines 170 forms a seal that reduces or prevents leakage of liquid during operation. In other examples, evacuation lines 170 and/or portions of inlet housing 224 and/or outlet housing 226 can include one or more additional seal elements for reducing or preventing leakage of liquid.

Outlet housing 226 includes poppet support 268, poppet receiver 270, and outlet rib 274. Poppet support 268 extends from an inner surface of outlet housing 226 to support and position poppet assembly 222 within internal passage 223. Poppet support 268 is depicted in FIG. 3C as a cross-bar that extends diametrically across internal passage 223, but in other examples, poppet support 268 extends only partway across internal passage 223 (e.g., to be coextensive with a radius of internal passage 223). Poppet receiver 270 is an elongate and hollow cylinder supported by poppet support 268 that functions to support poppet assembly 222 during axial translation between the open and closed states of poppet assembly 222. Poppet receiver 270 receives guide 234 and, more specifically, stem 244 of guide 234. The elongate shape of poppet receiver 270 can reduce angular misalignment of poppet assembly 222 (i.e., relative to axis A-A), but in other examples, poppet receiver 270 can adopt different sizes and/or shapes for receiving stem 244. Spring 272 is a compressible biasing element that extends between poppet support 268 and downstream end 245 of poppet assembly 222. In the depicted example, spring 272 extends from the downstream side of head 236 to a point on the upstream side of poppet support 268, but in other examples, spring 272 can also be received against neck 243 and/or poppet receiver 270, among other options.

Internal passage 223 extends from inlet 254 to outlet 264 and is configured to flow landfill well liquid from a landfill well. Internal passage 223 is defined by the exposed inner surfaces of inlet housing 224 and outlet housing 226 of housing assembly 220, which surfaces can contact the liquid being pumped. More specifically, internal passage 223 is defined by, in order along downstream direction DD, inlet shoulder 259, inlet chamfer 258, inlet throat 272, seat 260, chamber wall 276, and outlet rib 274. Chamber wall 276 defines downstream chamber 275, which is the region of flow passage 223 downstream of mating interface 263. Landfill well liquid that flows through inlet inlet 272 and poppet assembly 222 flows into downstream chamber 275 and then to outlet 264.

Spring 272 biases poppet 222 to the closed state and provides a biasing force that can be overcome by a flow of liquid from evacuation line 170 (FIG. 1). For example, spring 272 can provide 0.433 pound-force (approximately 1.92 Newtons) of resistance when poppet 222 is in the closed state to separate mating surface 250 and seat 260 (i.e., cracking force). Spring 272 can also provide, for example, 1.036 pound-force (approximately 4.61 Newtons) of resistance to fully open the gap between mating surface 250 and seat 260. In the depicted example, spring 272 is a coil spring that extends around stem 244 and axially between poppet support 268 and head assembly 232. In other examples, however, spring 272 can be of any suitable configuration for biasing poppet 222 to the closed state.

The biasing force provided by spring 272 can be selected to be minimal such that any flow rate of liquid is sufficient to move poppet assembly 222 from the closed state to the open state while still allowing spring 272 to move poppet assembly 222 back to the closed state after the pump phase of landfill pump 108 (FIG. 1) has completed. Notably, selecting a biasing force that is excessively high can prevent the flow of liquid from moving poppet assembly 222 to the open state during the pump phase of the pump cycle of landfill pump 108, potentially leading to undercounting of pump cycles of landfill pump 108. As such, a minimal biasing force advantageously can increase the accuracy with which pump cycle counter 210 counts pump cycles of landfill pump 108.

Outlet rib 274 is an annular rib that extends radially inward from outlet housing 226 directly upstream (i.e., in upstream direction UD) of screw threading 266. Outlet rib 274 is aligned with poppet support 268 such that outlet rib 274, poppet support 268, and poppet receiver 270 radially overlap. As referred to herein, components can be considered to radially overlap when the components are disposed at a common location along axis A-A such that a radial line extending orthogonally from axis A-A passes through each of those radially overlapping components. Similarly, components can be considered to axially overlap when the components are disposed at a common radial position relative to axis A-A, such that an axial line extending parallel to axis A-A passes through each axially overlapping component. Outlet rib 274 is sized to provide an axial stop for a threaded component engaged with screw threading 266 and, as will be discussed in more detail subsequently, to reduce accumulation of leachate material during operation of pump cycle counter 210.

Mating surface 250 and seat 260 are generally annular and form mating interface 263 when mating surface 250 contacts or rests against seat 260. Mating interface 263 acts as a seal to inhibit flow of liquid across mating interface 263 and, accordingly, through pump cycle counter 210 with poppet assembly 222 in the closed state. When mating surface 250 contacts or is positioned adjacent to seat 260 in order to form mating interface 263, poppet 222 is in the closed state. When mating surface 250 is sufficiently separated from seat 260 to form a gap that allows the flow of liquid, poppet assembly 222 is in the open state.

Counter 280 includes collar 282, set screw 284, annular tab 286, sensor housing 288, magnetic sensor 290, and display 292. As will be explained in more detail subsequently, counter 280 is capable of detecting the position of magnet 251 and, consequently, the position of poppet 222. Counter 280 can therefore be used to count the number of times that landfill pump 108 has pumped liquid out of landfill well 140 over a particular period of time. Collar 282 is annular and annularly surrounds portions of inlet housing 224 and outlet housing 226. Collar 282 functions to secure the other components of counter 280 to housing 220. Collar 282 is secured to housing 220 via set screw 284, which extends through collar 282 and into an outer surface of inlet housing 224, in the example shown. It is understood, however, that collar 282 can be connected to housing 220 in any desired manner. Sensor housing 288 slides axially in upstream direction UD onto collar 282 during installation of counter 280 and is held in place axially by annular tab 286. In the depicted example, sensor housing 288 is not annular and protrudes from one side of pump cycle counter 210, but in other examples, other configurations are possible. Sensor housing 288 houses magnetic sensor 290 and includes display 292. Magnetic sensor 290 is a sensor capable of detecting the changing position of magnet 251. Specifically, magnetic sensor 290 is capable of detecting whether poppet 222 is in the open state or the closed state based on the sensed strength of the magnetic field of magnet 251. Magnetic sensor 290 can be, for example, a hall effect sensor or another suitable sensor for sensing reactive to the magnetic field of magnet 251.

Display 292 is configured to display the number of complete pump cycles of landfill pump 108 as measured using pump cycle counter 210. Display 292 is configured to add an additional count to the displayed total when magnetic sensor 290 has detected poppet 222 moving from the closed state to the open state and back to the closed state, indicating one full pump cycle of landfill pump 108. Display 292 can be an analog display (e.g., a wheel counter) or digital display (e.g., a light-emitting diode display). Magnetic sensor 290 is configured to update display 292 or cause display 292 to be updated to show the current pump cycle count. Magnetic sensor 290 can include one or more additional mechanical or electronic components to facilitate pump cycle counting and to update display 292 with a current pump cycle count. For example, magnetic sensor 290 can include one or more of control circuitry and/or memory for determining the position of magnet 251, counting pump cycles of landfill pump 108, and/or updating the count displayed by display 292. Display 292 is depicted as including human-readable numerals, but in other examples, display 292 can be omitted and the count data can be stored to a memory as human-readable or machine-readable text.

In examples where pump cycle counter 210 includes a controller, the controller can include one or more of a processor, a microprocessor, a digital signal processor (DSP), an application specific integrated circuit (ASIC), a field-programmable gate array (FPGA), or other equivalent discrete or integrated logic circuitry. In examples where pump cycle counter 210 includes memory, the memory can be described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, the memory is a temporary memory, meaning that a primary purpose of the memory is not long-term storage. The memory, in some examples, is described as volatile memory, meaning that the memory does not maintain stored contents when power to the controller is turned off. Examples of volatile memories can include random access memories (RAM), dynamic random access memories (DRAM), static random access memories (SRAM), and other forms of volatile memories.

In operation, liquid flows from the downstream end of evacuation line 170 sequentially across the portions of internal passage 223 defined by inlet shoulder 259, inlet chamfer 258, and inlet throat 262. As will be discussed in more detail subsequently, the diameter of internal passage 223 narrows in a downstream direction DD through inlet housing 224. Sufficient flow of liquid to overcome the biasing force of spring 272 causes poppet assembly 222 to translate axially in a downstream direction DD to the open state, allowing flow of liquid into downstream chamber 275 defined by chamber wall 276. Liquid then flows over rib 274 and into the downstream portion of evacuation line 170 received by outlet housing 226. When the flow of liquid stops (i.e., during the dwell phase of landfill pump 108; FIG. 1), the biasing force provided by spring 272 causes poppet assembly 222 to translate axially in the upstream direction UD to cause mating surface 250 to engage with seat 260, placing poppet assembly 222 in the closed state. The biasing force provided by spring 272 is generally selected to be low, such that a typical flow of liquid can overcome the force of spring 272 to move poppet 222 into the open state.

During the operation of one full pump cycle, pump 108 transitions from the dwell phase to the pump phase and then back to the dwell phase. Accordingly, during one full pump cycle, poppet assembly 222 moves from the closed state to the open state and then back to the closed state. The movement of poppet assembly 222 from the closed state to the open state and then back to the closed state is referred to herein as a "poppet cycle" or a "whole poppet cycle," where each discrete movement of poppet assembly 222 (i.e., movement from the closed state to the open state or movement from the open state to the closed state) is referred to as a "half poppet cycle." It is understood that counter 280 can be configured to increment the pump cycle count based on sensing a whole poppet cycle or a half poppet cycle, among other options. Magnetic sensor 290 can be configured to detect, based on the position of magnet 251, that poppet assembly 222 has transitioned from the closed state to the open state and then back to the closed state (i.e., that one whole poppet cycle has occurred), and increment the count displayed by display 292 by one. In some examples, magnetic sensor 290 can be configured to provide half-increments to display 292 for each half poppet cycle, such that the transition of poppet assembly 222 from the closed state to the open state increments the count displayed by display 292 by one-half, and that the subsequent transition of poppet assembly 222 from the open state back to the closed state increments the count by one-half, thereby incrementing the pump cycle count by one over the full pump cycle. In some examples, magnetic sensor 290 can be configured to move a lever arm that is configured to increment the count displayed by display 292 by a whole count and/or a half count.

In the depicted example, poppet assembly 222 has axial length $AL_a$, head assembly 232 has axial length $AL_{h1}$, cavity 238 has axial length $AL_{c1}$, cap 242 has axial length $AL_e$. The axial length from the upstream end of cap 242 to the downstream end of cavity 238 is $AL_a$. Inlet chamfer 258 has axial length $AL_i$, mating surface 250 has axial length $AL_{m1}$, downstream poppet chamfer 248 has axial length $AL_n$, and seat 260 has axial length $AL_s$. Head 236 has an outer diameter (i.e., with respect to axis A-A) of $D_h$, an upstream diameter (i.e., a diameter at the upstream end of head 236) of $D_{m1}$, and a downstream diameter (i.e., a diameter at the downstream end of head 236) of $D_n$. Seat 260 has an upstream diameter (i.e., a diameter at the upstream end of seat 260) of $D_{su1}$ and a downstream diameter (i.e., a diameter at the downstream end of seat 260) of $D_{sd1}$, inlet shoulder 259 has a diameter of $D_i$, cap 242 has an internal diameter of $D_c$, neck 253 has a diameter of De, stem 244 has a diameter of $D_f$, outlet rib 274 has a diameter of Dr, and downstream chamber 275 and the inner surface of chamber wall 276 have a diameter of Do. Inlet chamfer 258 extends from diameter $D_i$ to diameter $D_{su1}$ along axial length $AL_i$ according to angle $\theta_a$, seat 260 extends from diameter $D_{su1}$ to diameter $D_{sd1}$ along axial length $AL_s$ according to $\theta_b$, mating surface 250 extends from $D_{m1}$ to $D_h$ along axial length $AL_{m1}$ according to $\theta_b$, seat 260 extends from diameter $D_{su1}$ to diameter $D_{sd1}$ according to $\theta_b$, and downstream poppet chamfer 248 extends from diameter $D_h$ to $D_n$ along axial length $AL_n$ according to $\theta_c$. Angles $\theta_a$, $\theta_b$, and $\theta_c$ are measured relative to a line parallel to axis A-A and an outwardly-extending line (i.e., away from axis A-A) tangential to inlet chamfer 258, mating surface 250/seat 260, and downstream poppet chamfer 248, respectively.

Accordingly, the diameter of internal passage 223 decreases along axis AA in downstream direction DD along inlet chamfer 258 to $D_{su1}$, increases along seat 260 to the downstream end of inlet housing 224 to $D_{sd1}$, increases after the downstream end of inlet housing 224 to Do, and decreases after the downstream end of chamber wall 276 to Dr across outlet rib 274. As the components of internal passage 223 are annular and/or cylindrical in the depicted example, the cross-sectional area of internal passage 223 also decreases along axis AA in downstream direction DD along inlet chamfer 258 to $D_{su1}$, increases along seat 260 to the downstream end of inlet housing 224 to $D_{sd1}$, increases after the downstream end of inlet housing 224 to Do, and decreases after the downstream end of downstream chamber wall 276 to Dr across outlet rib 274.

Liquid flowing through internal passage 223 is received at inlet 254 and flows through the narrowing portion of inlet housing 224 defined by inlet chamfer 258. Inlet chamfer 258 reduces the diameter of internal passage 223 along axial length $AL_i$ of inlet chamfer 258. Inlet chamfer 258 can be an annular sloped surface and can be considered a frustoconical surface. Inlet chamfer 258 is sloped to reduce the turbulence of the flow of the liquid into inlet throat 262 and toward poppet assembly 222. The sloped inlet chamfer 258 does not include sharp corners that can create locations for contaminants to accumulate.

When the force applied by the liquid is sufficient to overcome the biasing force of spring 272, the liquid displaces poppet assembly 222 in downstream direction DD and poppet assembly 222 is actuated to the open state, permitting liquid flow through a gap formed between seat 260 and mating surface 250. The liquid flows through the gap across seat 260 and mating surface 250, which gap can be of variable volume and cross-sectional area depending on the axial displacement of poppet assembly 222 resulting from the force applied by the liquid.

Seat 260 increases the diameter of internal passage 223 along axial length $AL_s$. Seat 260 can be an annular sloped surface and can be considered a frustoconical surface. Seat 260 is sloped to reduce the turbulence of the flow of the liquid out of inlet throat 262 and into downstream chamber 275. The sloped configuration of seat 260 does not include sharp corners that can create locations for contaminants to accumulate.

The liquid then flows into downstream chamber 275. Downstream chamber 275 is defined by chamber wall 276, which has an increased diameter and cross-sectional area orthogonal to the axis A-A as compared to the upstream portions of internal passage 223, upstream portions of which in upstream direction UD from the mating interface 263. The increased diameter of chamber wall 276 relative to the gap between poppet assembly 222 and inlet housing 224 allows the flow of liquid around head assembly 232, reducing accumulation of leachate on head assembly 232. In some examples, the diameter of chamber wall 276 is selected to increase the velocity of fluid flow through downstream chamber 275 according to Bernoulli's principle, which can further reduce contaminant accumulation in downstream chamber 275 and along chamber wall 276. Notably, a portion of the flow of liquid flows around head assembly 232 and toward the interior of downstream chamber 275. Downstream poppet chamfer 248 permits greater inward flow (i.e., flow toward axis A-A) than designs lacking a chamfer or equivalent contouring on the downstream end of head 236, thereby reducing accumulation of liquid along the downstream end of head assembly 232 and along chamber wall 276 during operation of pump cycle counter 210. The angled surface of downstream poppet chamfer 248 reduce the turbulence of liquid flow and eliminates sharp corners on which contaminant can accumulate.

The liquid then flows through the narrowing portion of internal passage 223 defined by outlet rib 274. The height of outlet rib 274 extends radially away from the inner surface of chamber wall 276 such that the inner diameter Dr of outlet rib 274 is similar to the tube, pipe, or channel intended to be attached to screw threading 266 at outlet 264. The difference in diameter between Dr of outlet rib 274 and Do of chamber wall 276 is selected to reduce contaminant accumulation along the interface between the downstream end of chamber wall 276 and the upstream end of outlet rib 274 while still allowing outlet rib 274 to act as a stop for the tube, pipe, or channel affixed to screw threading 266.

Inlet throat 272 has a reduced diameter $D_{su1}$ relative to the diameter Do chamber wall 276 to allow head 236 to form mating interface 263 with seat 260 on the downstream end of inlet throat $D_{su1}$ when poppet assembly 222 is in the closed state, and to allow leachate liquid to flow through a space between head 236 and chamber wall 276 when poppet assembly 222 is in the open state. The increased diameter of chamber wall 276 relative to inlet throat 262 eliminates chokepoints around head 236 when poppet assembly 222 is in the open state, and thereby reduces contaminate accumulation around head 236 during operation. Advantageously, this reduces turbulence the flow of landfill liquid past head 236 during operation. Reducing turbulence can also reduce contaminate precipitation along the surfaces of head 236, seat 260, chamber wall 276, etc. Further, the increased diameter of chamber wall 276 reduces the incidence of stalled flow past head 236, which also inhibits contaminant accumulation along the surfaces of head 236, seat 260, chamber wall 276, etc.

The sloped structures of mating surface 250 and seat 260 impart a radial flow component to the flow of landfill liquid to guide the landfill liquid radially outward around mating surface 250 from the narrower diameter $D_i$ of inlet throat 262 to the wider diameter Do of chamber wall 276 defining downstream chamber 275, while also imparting an axial flow component to the flow of landfill liquid, thereby reducing turbulence as landfill liquid flow through internal passage 223 as internal passage 223 transitions between diameter $D_i$ of inlet throat 262 and diameter Do of chamber wall 276. Advantageously, this also reduces contaminate accumulation as landfill liquid flows from the portion of inlet passage 223 defined by inlet throat 223 to downstream chamber 275.

Further, in the depicted example, the diameter and cross-sectional area orthogonal to the axis A-A of internal passage 223 decreases through inlet housing 224 to allow inlet throat 262 to be narrower than chamber wall 276 while allowing pump cycle counter to attach at both screw threading 256 and screw threading 266 to tubes, pipes, channel, etc. having substantially the same diameter. Advantageously, this can allow inlet housing 224 and outlet housing 226 to be attached to evacuation line 170 using the same size of fitting (e.g., a standardized fitting size). However, in other examples inlet housing 224 can adopt different structures or configurations and screw threading 256 and screw threading 266 can be configured to mate with differently-sized fittings.

The axial and radial components of angle $\theta_a$ of inlet chamfer 258 are defined, respectively, by axial length $AL_i$ and the difference between diameters $D_i$ and $D_{su1}$. $AL_i$, $D_i$, and $D_{su1}$ are selected to provide an angle $\theta_a$ that reduces contaminant accumulation along the narrowing portion of inlet housing 224 defined by inlet chamfer 258. The angled surfaces reduce the turbulence of the flow of landfill liquid along such surfaces, eliminating sharp corners on which contaminant can accumulate.

The axial and radial components of the angle of mating surface 250 relative to axis A-A are defined, respectively, by axial length $AL_{m1}$ and the difference between diameters $D_{m1}$ and $D_h$. $AL_{m1}$, $D_{m1}$, and $D_h$ are selected to provide an angle that reduces contaminant accumulation along the expanding portion of head 236 defined by mating surface 250. Similarly, the axial and radial components of the angle of seat 260 are defined by relative to axis A-A are defined, respectively, by axial length $AL_s$ and the difference between diameters $D_{sd1}$ and $D_{su1}$. $AL_s$, $D_{sd1}$, and $D_{su1}$ are selected to provide an angle that reduces contaminant accumulation along the expanding portion of housing 224 defined by seat 260. In the depicted example, mating surface 250 and seat 260 have the same angle $\theta_b$ relative to axis A-A, increasing contact area between mating surface 250 and seat 260 to reduce flow of leachate across mating interface 263 and into downstream chamber 275 when poppet assembly 222 is in the closed state and thereby inhibit the flow of liquid through pump cycle counter 210 when poppet assembly 222 is in the closed state. However, in other examples, mating surface and seat 260 can adopt differing angles while still forming mating interface 263 to prevent liquid flow across mating interface 263 and into downstream chamber 275 when poppet assembly 222 is in the closed state.

In the depicted example, mating surface 250 extends past seat 260 in a downstream direction DD. More specifically, the downstream end of mating surface 250 extends both axially downstream of and radially outside of the downstream end of seat 260. The depicted example increases displacement of poppet assembly 222 during leachate flow, increasing the difference in intensity of the magnetic field of magnet 251 sensed by magnetic sensor 290 in the open and closed states of poppet assembly 222. In the depicted example, mating surface also extends past seat 260 in an upstream direction UD. More specifically, the upstream end of mating surface 250 extends both axially upstream of and radially inside of the upstream end of seat 260. This configuration reduces turbulent flow across poppet assembly 222, and provides the benefits of reduced turbulent flow discussed elsewhere herein. Such a configuration also further enhances sealing by the sloped surface of seat 260 guiding mating surface 250 into annular engagement with seat 260.

The axial and radial components of angle $\theta_c$ of downstream poppet chamfer 248 are defined, respectively, by axial length $AL_n$ and the difference between diameters $D_h$ and $D_n$. $AL_n$, $D_h$, and $D_n$ are selected to provide an angle $\theta_c$ that reduces contaminant accumulation along the narrowing portion of head 236 defined by downstream poppet chamfer 248.

Angles $\theta_a$, $\theta_b$, and $\theta_c$ are not right angles (i.e., 90-degree angles) relative to axis A-A, such that inlet shoulder 259, mating surface 250/seat 260, and downstream poppet chamfer 248, respectively, are sloped relative to the flow axis (coaxial with axis A-A in the depicted example). Advantageously, this geometry eliminates sharp corners at the locations of inlet shoulder 259, mating surface 250, and downstream poppet chamfer 248, reducing the turbulence of landfill liquid flow and reducing contaminant accumulation during operation. Angles $\theta_a$, $\theta_c$ can be, for example, 30, 45, or 60 degrees, or any other desired angle for forming a sloped surface to reduce contaminate accumulation during operation. Angle $\theta_b$ can be 120, 135, or 150 degrees, or any other desired angle for forming a sloped surface to reduce contaminate accumulation during operation.

$D_h$ of head 236 and Do of chamber wall 276 are selected to allow sufficient distance between head assembly 232 and the inner surface of chamber wall 276 to allow liquid to flow radially outward of head 236 as guided by the sloped mating surface 250 without contaminant accumulation along head assembly 232 and/or chamber wall 276. In yet further examples, head assembly 232 can be formed of a polymer material and poppet assembly 222 can be formed around magnet 251 by, for example, a polymer casting technique.

In the depicted example, $AL_e$ of cap 242 is less than the axial length $AL_a$ from the upstream end of cap 242 to the downstream end of cavity 238, such that cap 242 does not extend the full axial length of cavity 238. The depicted design can, in some examples, increase the tolerances for machining cavity 238 without causing cap 242 to protrude excessively in an upstream direction UD, which can expose cornered surfaces that can accumulate contaminants. However, in other examples, cap 242 can extend the full axial length of cavity 238.

Pump cycle counter 210 can be assembled by installing spring 272 on poppet support 268 or the downstream end of downstream end 245, and subsequently inserting stem 244 into poppet receiver 270 of outlet housing 226. Poppet assembly 222 can be assembled prior to insertion of stem 244 into poppet receiver 270 or poppet assembly 222 can be assembled in place. Poppet assembly 222 is assembled by inserting magnet 251 into cavity 238 and attaching cap 242 to head 236. Seal 230 can be installed on inlet housing 224 and inlet housing 224 can then be attached to outlet housing 226 using threaded interface 228. Collar 282 can be affixed to inlet housing 224 by set screw 284, and sensor housing 288 can be installed on collar 282. Annular tab 286 can then be installed to prevent axial displacement of sensor housing 288. Pump cycle counter 210 can then be installed in landfill pump system 100 by attaching evacuation line 170 to screw threading 256, 266.

Figure 4A:
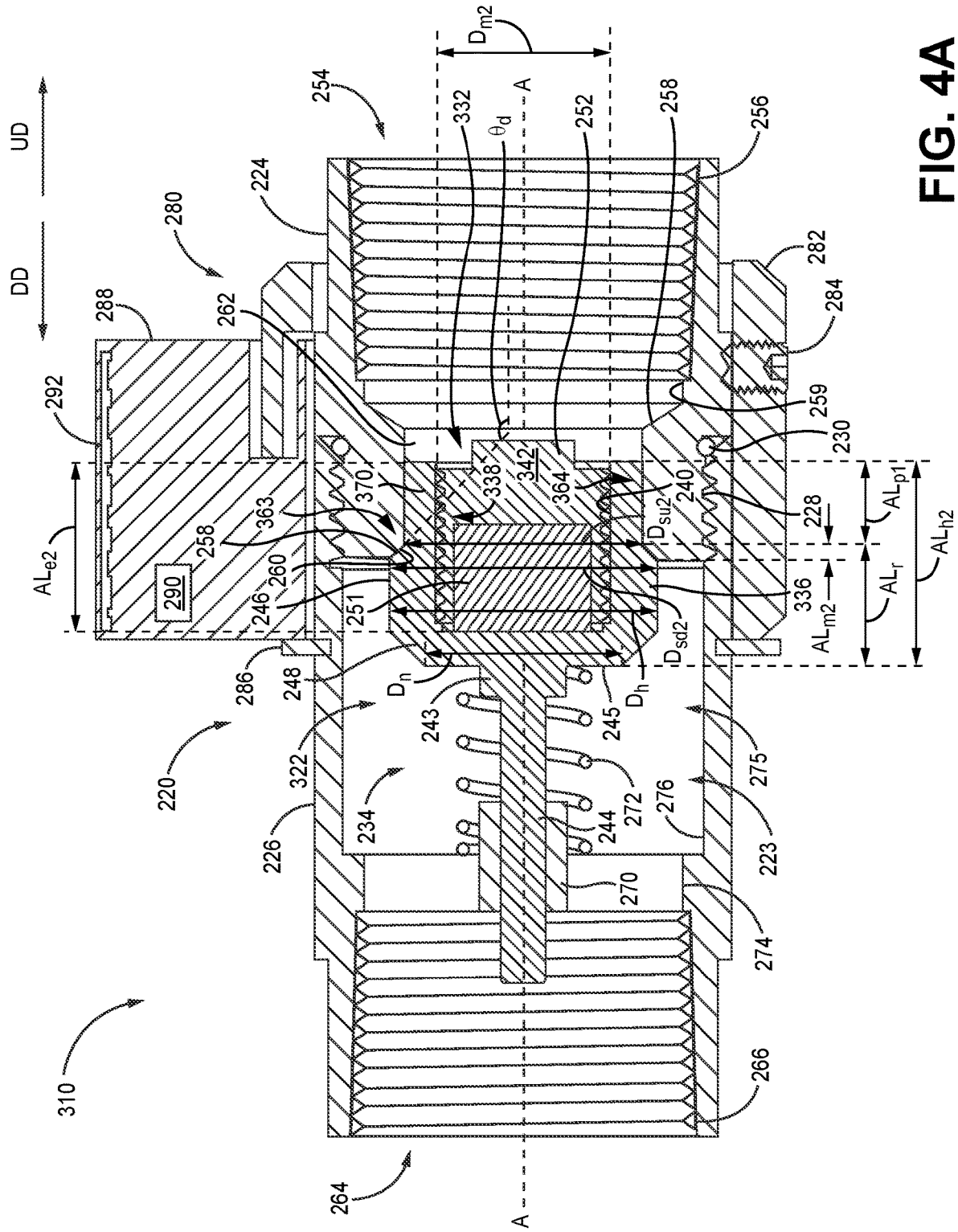
FIG. 4A is a cross-sectional view of a further example of a landfill pump cycle counter in a closed state.
Figure 4B:
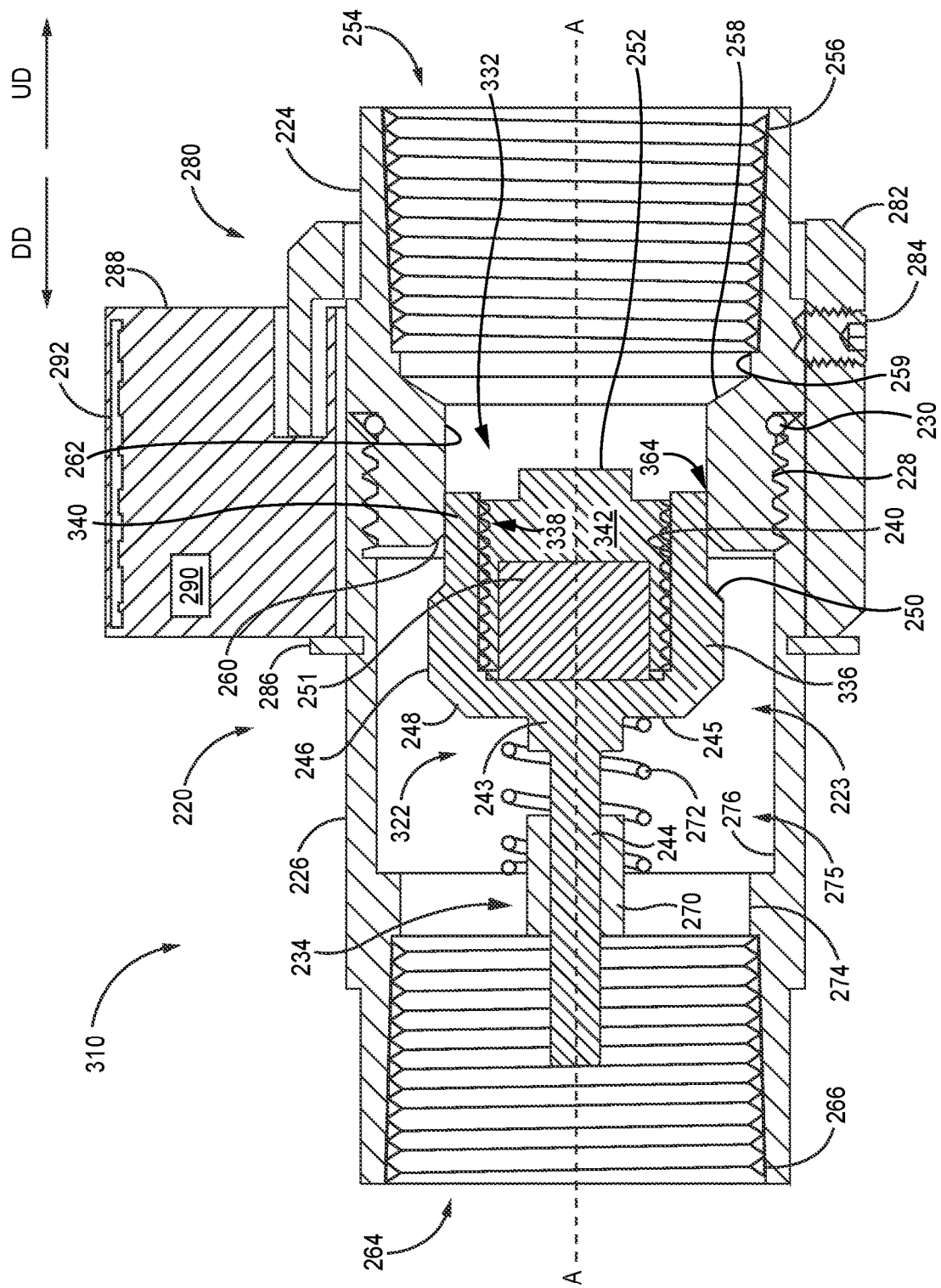
FIG. 4B is a cross-sectional view of the example of the landfill pump cycle counter of FIG. 4A in an intermediate state.
Figure 4C:
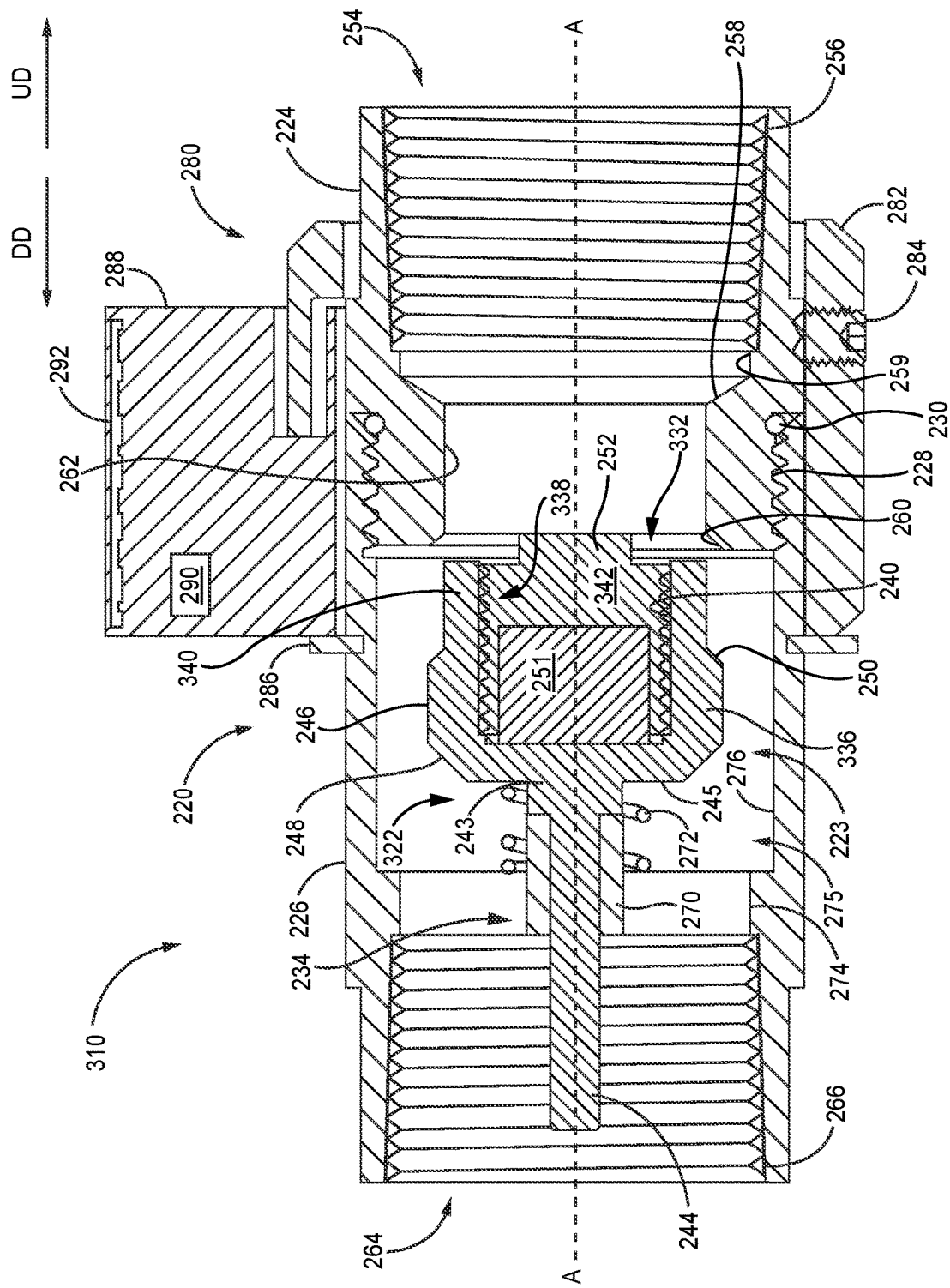
FIG. 4C is a cross-sectional view of the example of the landfill pump cycle counter of FIGS. 4A-B in an open state.

FIGS. 4A-4C are cross-sectional views of pump cycle counter 310, which is a landfill pump cycle counter design that increases the axial travel of poppet assembly 222 required to allow flow of liquid into downstream chamber 275. Pump cycle counter 310 can also be placed in landfill pump system 100 as pump cycle counter 110. Pump cycle counter 310 is one example of a landfill pump cycle counter that decreases the likelihood that a pump cycle of a low-flow rate landfill pump is uncounted. FIG. 4A depicts pump cycle counter 310 in the closed state, FIG. 4B depicts pump cycle counter 310 in an intermediate state between the open and closed states, and FIG. 4C depicts pump cycle counter 310 in the open state. States of pump cycle counter 310 intermediate to the open and closed states can be referred to in some examples as an "intermediate state."

Pump cycle counter 310 includes substantially the same components as pump cycle counter 210, but includes poppet assembly 322 rather than poppet assembly 222. Poppet assembly 322 is substantially similar to poppet assembly 222, but includes head assembly 332, which in turn includes head 336 instead of head 236 and cap 342 instead of cap 242. Head 336 is substantially similar to head 236 and includes downstream end 245, outer surface 246, and downstream chamfer 248. Head 336 also includes projection 340 and mating surface 350 and defines inner cavity 338. Projection 340 projects in an upstream direction UD from mating surface 250 and extends the distance that head 336 must travel to break mating interface 364. Projection 340 extends from an axially-upstream end of mating surface 350 and defines cavity 338, which is axially longer than cavity 238 of head 236 (FIGS. 2-3C). In the depicted example, projection 340 is shaped as a hollow cylinder and has a substantially constant diameter along axial length $AL_{p1}$, but in other examples projection 340 can adopt different shapes. Cap 342 is axially longer than cap 242 such that the axially-upstream portions of cap 342 radially overlap or are axially adjacent to the upstream end of projection 340 to prevent accumulation of leachate along the upstream end of head assembly 332.

Head 336 has diameter $D_n$, mating surface 350 has upstream diameter $D_{su2}$ and downstream diameter $D_h$, projection has outer diameter $D_{su2}$ and inner diameter $D_{m2}$, and seat 360 has upstream $D_{su2}$ and downstream diameter $D_{sd2}$. Head 336 has axial length $AL_{h2}$, where projection 340 has axial length $AL_{p1}$ and the portion of head 336 downstream of projection 340 has axial length $AL_r$. Mating surface 350 and seat 360 extend along axial length $AL_{m2}$ from diameter $D_{su2}$ to diameter $D_{sd2}$ according to angle $\theta_d$. Angle $\theta_d$ is measured relative to a line parallel to axis A-A and an outwardly-extending line (i.e., away from axis A-A) tangential to mating surface 350 and seat 360. Cap 342 extends axial length $AL_{e2}$. $AL_{e2}$ is selected such that axially-upstream portions of cap 342 radially overlap or are axially adjacent to the upstream end of projection 340 when cap 342 is installed. Pump cycle counter 310 can be assembled according to substantially the same method as outlined with respect to pump cycle counter 210.

Angles $\theta_d$ is not a right angle (i.e., a 90-degree angle) relative to axis A-A, such that mating surface 350 and seat 360 are sloped relative to the flow axis (coaxial with axis A-A in the depicted example). Advantageously, this geometry eliminates sharp corners at the locations of mating surface 350 and seat 360, reducing the turbulence of liquid flow and reducing contaminant accumulation during operation. Angle $\theta_d$ can be, for example, 30, 45, or 60 degrees, or any other desired angle for forming a sloped surface to reduce contaminate accumulation during operation. The sloped structures of mating surface 350 and seat 360 impart a radial flow component to the flow of landfill liquid to guide the landfill liquid radially outward around mating surface 350 and head 336 while also imparting an axial flow component to the flow of landfill liquid, reducing the turbulence liquid flow through internal passage 223 across the transition between diameter $D_i$ of inlet throat 262 and diameter Do of chamber wall 276 and reducing contaminate accumulation.

Mating surface 350 and seat 360 have substantially the same axial and radial dimensions in the depicted example, but in other examples, mating surface 350 and seat 360 can include differing axial and radial dimensions such that mating surface 350 and seat 360 have differing axial and radial extents. For example, mating surface 350 can extend axially downstream of the downstream end of seat 360 or radially outward of the radially outer edge of seat 360. As a further example, mating surface 350 can extend axially upstream of the upstream end seat 360 and/or radially inward of the radially inner edge of seat 360, and projection 340 can extend radially outward upstream of mating surface 350 to contact inlet throat 262 and/or have substantially the same outer diameter as inlet throat 262. In yet further examples where mating interface 364 is the only mating or sealing interface required to prevent axial flow of liquid through pump cycle counter 310, mating surface 350 and seat 360 can be omitted. Mating surface 350 and seat 360 extend at the same angle $\theta_a$ in the depicted example. Mating surface 350 and seat 360 can be an annular sloped surfaces and can be considered frustoconical surfaces. The sloped shapes of mating surface 350 and set 360 to reduce the turbulence of the flow of the liquid over head 336 and into downstream chamber 275, and do not include sharp corners that can create locations for contaminants to accumulate.

Projection 340 forms mating interface 364 with inlet throat 262 when poppet assembly 222 is in the closed state (FIG. 4A) and in states intermediate to the open and closed states (e.g., FIG. 4B). Projection 340 is disengaged from inlet throat 262 when poppet assembly 322 is in the open state (FIG. 4C). Mating interface 364 increases the axial distance (i.e., along axis A-A) required to move poppet assembly 322 from the closed state (FIG. 4A) to an open state that allows flow of liquid (FIG. 4C), and reduces or prevents liquid flow through pump cycle counter 310 when poppet assembly 322 is in an intermediate state (e.g., FIG. 4B). Projection 340 can be cylindrical projection in FIGS. 4A-C such that projection 340 can form a continuous annular mating interface 364 with the annular inner surface of inlet throat 262. In other examples, projection 340 and inlet throat 262 can have different cross-sectional profiles orthogonal to the axis A-A, but in all examples, the outer surface of projection 340 and the inner surface of inlet throat 262 are sized and structured to form mating interface 364 in the closed state and in intermediate states.

FIG. 4A shows the closed state of poppet assembly 322. In the closed state, mating surface 350 contacts or is otherwise is disposed directly adjacent to seat 360 to form mating interface 363. Mating surface 350 radially overlaps with seat 360 with mating surface 350 engaged with seat 360 to form the mating interface 363. The outer surface of projection 340 also contacts and/or is positioned adjacent to the inner surface of inlet throat 262 to form mating interface 364. In the example shown, the entirety of projection 340 extends upstream of the upstream end of seat 360 such that every axial point along projection 340 radially overlaps with throat 262 with poppet assembly 322 in the closed state. As such, in the closed state, the upstream end of projection 340 extends upstream of the upstream end of seat 360. It is understood that, in some examples, less than the full axial length of projection 340 can form mating interface 364. For example, projection 340 can have a radially narrower portion for a length of projection 340 and then include a radially wider portion at or near the upstream end of projection 340 that extends radially outward to engage with inlet throat 262. In either case, poppet assembly 322 forms a first mating interface 363 and a second mating interface 364 with housing 220. The first and second mating interfaces 363, 364 can be considered to form a single, axially elongate mating interface that inhibits flow of liquid in the downstream direction DD.

FIG. 4B shows an intermediate state of poppet assembly 322. In intermediate states, poppet assembly 322 is shifted axially in downstream direction DD relative to the position of poppet assembly 322 when poppet assembly 322 is in the closed state. In intermediate states of poppet assembly 322, mating surface 350 is axially spaced from seat 360 to break the mating interface 363 and form an axial gap therebetween. Due to the axial gap between mating surface 350 and seat 360, mating surface 350 and seat 360 do not form mating interface 363. The presence of mating interfaces 363, 364 inhibit liquid flow through pump cycle counter 310 when the mating interface 363, 364 is formed.

A portion of the outer surface of projection 340 contacts the inner surface of inlet throat 262 when poppet assembly 322 is in intermediate states. In intermediate states, mating interface 364 is formed between the portions of inlet throat 262 and projection 340 that radially overlap. Unlike in the closed state shown in FIG. 4A, inlet throat 262 and projection 340 do not radially overlap at all axial points along projection 340. Rather, in intermediate states, inlet throat 262 and projection 340 radially overlap along only a portion of the axial length of projection 340. The axial position of mating interface 364 and/or the axial length of mating interface 364 changes as poppet assembly 322 shifts through the intermediate states between the closed and open states. Further, in intermediate states, projection 340 radially overlaps with the at least a portion of seat 360. The intermediate state depicted in FIG. 4B is only one possible intermediate state and it is understood that in other intermediate states, poppet assembly 322 can be in different axial positions along axis A-A. However, in all intermediate states, inlet throat 262 and projection 340 at least partially radially overlap to form mating interface 364. The presence of mating interface 364 inhibits liquid flow through pump cycle counter 310 when poppet assembly 322 is in an intermediate state. With poppet assembly 322 in the intermediate states, the liquid continues to act on the upstream end of head assembly 332 to drive poppet assembly 322 in downstream direction DD.

FIG. 4C depicts the open state of poppet assembly 322. In the open state of poppet assembly 322, poppet assembly 322 is shifted axially in a downstream direction DD of the position of poppet assembly 322 in the closed state and the intermediate states. More specifically, in the open state of poppet assembly 322 the axially upstream end of projection 340 is downstream of the upstream end of seat 360, such that the projection 340 and inlet throat 262 do not form mating interface 364. Mating surface 350 is also spaced further axially away from seat 360 than in the intermediate states of poppet assembly 322 and mating interface 363 is not formed therebetween. Both mating interface 363 and mating interface 364 are broken with poppet assembly 322 in the open state. As neither mating interface 363 nor mating interface 364 is formed when poppet assembly 322 is in the open state, the liquid is able to flow more freely through pump cycle counter 310 than when pump cycle counter 310 is in the closed or intermediate states. Mating interfaces 363 and 364 inhibit the flow of liquid through pump cycle counter 310 when poppet assembly 322 is in the closed and intermediate states, such that appreciable liquid flow through pump cycle counter 310 occurs only when poppet assembly 322 is in the open state. In the open state depicted in FIG. 4C, the downstream end of neck 243 contacts the upstream end of poppet receiver 270. Poppet receiver 270 can act as an axial stop to prevent over-compression of spring 272 during operation of pump cycle counter 310. However, in other examples, the neck 243 does not contact poppet receiver 270 in the open state of poppet 322.

As described previously with respect to poppet assembly 222, the biasing force provided by spring 272 can be selected to be minimal such that any flow rate of liquid is sufficient to move poppet assembly 322 from the closed state while still allowing spring 272 to move poppet assembly 322 back to the open state after the pump phase of the pump cycle of landfill pump 108 (FIG. 1) has completed. A minimal biasing force provides the substantially the same advantages as articulated with respect to the discussion of poppet assembly 222.

Magnet 251 (and, accordingly the poppet assembly) is required to travel a minimum threshold distance in order to produce a sufficient magnetic field difference for detection by magnetic sensor 290. In some examples, the minimum threshold travel distance is less than the distance that poppet assembly 222 needs to travel to allow liquid to flow around the poppet assembly and to outlet 264. In some examples, the force applied by the pumped liquid is sufficient to move the poppet assembly to allow liquid to flow to outlet 264 but is insufficient to cause sufficient axial translation of the poppet assembly for magnetic sensor 290 to detect that the poppet assembly is in the open state. Accordingly, in these examples, pump cycles of landfill pump 108 can be undetected by the landfill pump cycle counter due to magnetic sensor 290 failing to detect that the poppet assembly has moved to an open state. Stated differently, in some examples, the displacement of poppet assembly 222 required to transition poppet assembly 222 from the open state to the closed state is not detectable by magnetic sensor 290, potentially causing undercounting of the number of pump cycles of the landfill well pump.

The inclusion of projection 340 requires poppet assembly 322 to move axial length $AL_{p1}$ for liquid to flow liquid past head assembly 332. $AL_{p1}$ is longer than, for example, the distance that poppet assembly 222 (FIGS. 2-3C), which lacks projection 340 or an equivalent structure, must travel to allow liquid past head assembly 232. Poppet assembly 322 must translate further axially from the closed state to reach the open state than designs lacking projection 340, advantageously reducing the likelihood that pump cycle counter 310 undercounts the pump cycles of landfill pump 108 (FIG. 1). The axial length $AL_{p1}$ of projection 340 (and, accordingly the axial length $AL_{h2}$ of head 336) can be selected based on the desired axial distance between the open and closed states for accurate detection by magnetic sensor 290.

Figure 5:
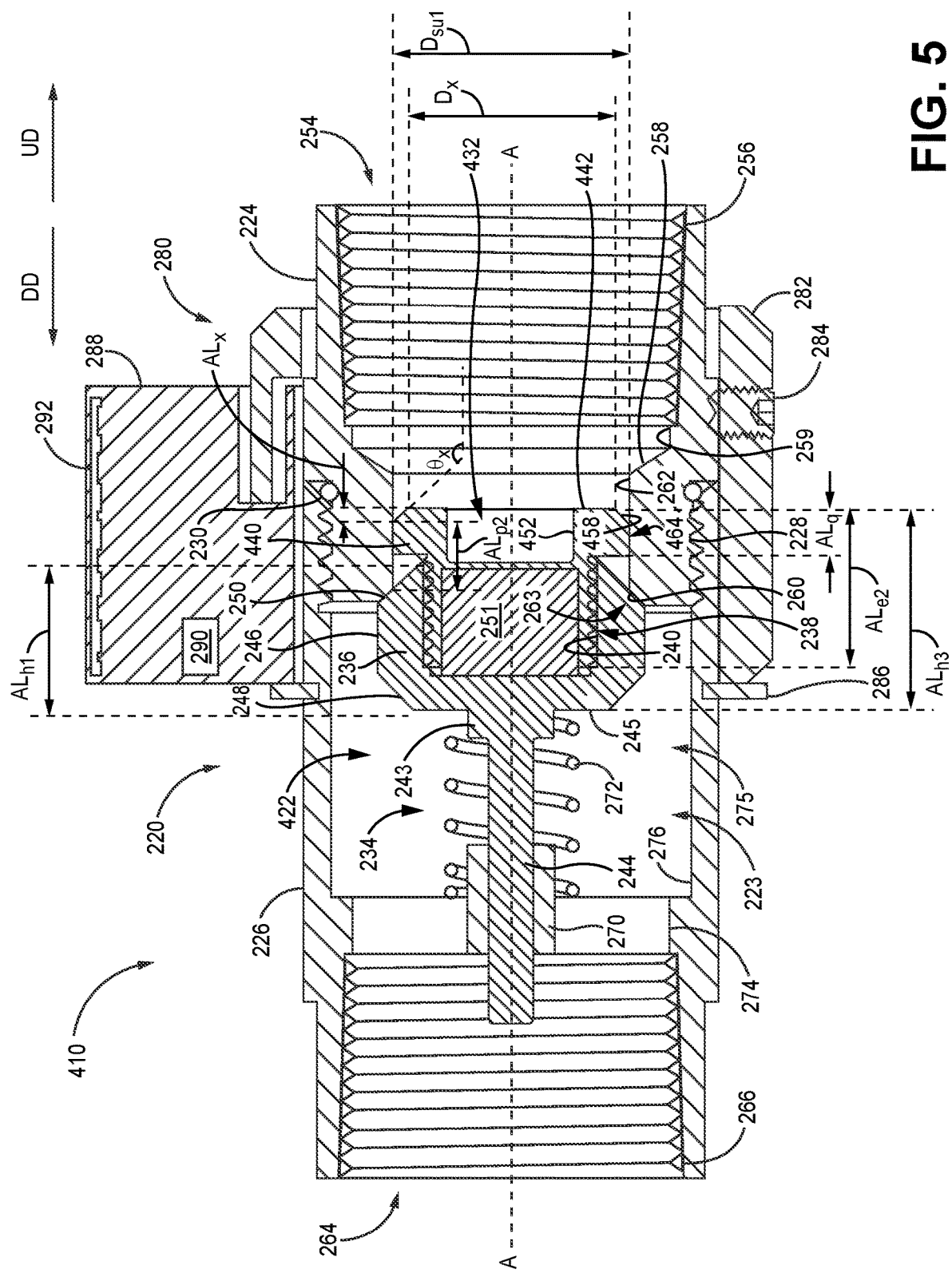
FIG. 5 is a cross-sectional view of yet a further example of a landfill pump cycle counter.

FIG. 5 is a cross-sectional view of pump cycle counter 410, which is a further example of a landfill pump cycle counter including a projection for reducing undercounting of pump cycles of landfill pumps. Pump cycle counter 410 can also be placed in landfill pump system 100 as pump cycle counter 110. Pump cycle counter 410 is substantially similar to pump cycle counter 210 (FIGS. 2-3C) and pump cycle counter 310 (FIGS. 4A-4C), but includes poppet assembly 422 rather than poppet assembly 222. Poppet assembly 422 is substantially similar to poppet assembly 222 but includes head assembly 432 rather than head assembly 232. Head assembly 432 is substantially similar to head assembly 232 but includes cap 442. Cap 442 includes tool interface 452.

Unlike cap 242, cap 442 includes a projection that extends axially-upstream of the upstream end of mating surface 252. Specifically, cap 442 includes projection 440, which functions in substantially the same manner as projection 340 to reduce undercounting of landfill pump cycles, but is formed on the cap of the poppet assembly rather than the head of the poppet assembly. Advantageously, cap 442 can enable retrofitting of installed landfill pump cycle counters according to pump cycle counter 210 to reduce undercounting or in examples of landfill pump system 100 including pump cycle counter 210 where undercounting is suspected or confirmed to be occurring. Like projection 340, projection 440 requires greater axial travel to allow fluid flow through pump cycle counter 410 than designs lacking a projection, as will be discussed in more detail subsequently. Like cap 242, cap 442 is installed by a threaded interface that engages with inner surface 240 of cavity 238 to retain magnet 251 within cavity 238.

Projection 440 of cap 442 extends radially outward towards the surface of inlet throat to form mating interface 464 and projects in an upstream direction UD away from the upstream end of head 236 (i.e., the upstream end of mating surface 250). Cap 442 has axial length $AL_{e2}$ and projection 440 has axial length $AL_q$. Projection 440 is also substantially cylindrical and has a substantially constant outer diameter downstream of chamfer 458. The upstream end of mating interface 464 (i.e., the downstream end of chamfer 458) is located axial length $AL_{p2}$ upstream of the upstream end UD of seat 260. $AL_{p2}$ is the axial travel length added between the open and closed states of poppet assembly 422 by inclusion of projection 440. The inclusion of projection 440 gives head assembly 432 an overall axial length of $AL_{h3}$, which is the sum of axial length $AL_{h1}$ of head 236 and axial length $AL_q$ of projection 440. Cap 442 has diameter $D_{su1}$ at the outer extent of projection 440, such that the outer diameter of projection 440 is substantially the same as the inner diameter of inlet throat 262. Tool interface 452 is formed on an axially-upstream end of cap 442 and functions in a similar manner as tool interface 252, described previously with respect to pump cycle counter 210 (FIGS. 2-3C). Tool interface 452 is formed as an indentation in cap 442 in the depicted example, but in other examples, tool interface 452 can project in an axially upstream direction UD (e.g., similar to tool interface 252).

In the depicted example, cap 442 includes chamfer 458 on an upstream end of projection 440. Chamfer 458 extends axial length $AL_x$ from the axially-upstream end of projection 440 and decreases in diameter from $D_{su3}$ of projection 440 to diameter $D_x$ at the axially-upstream end of chamfer 458 along axial length $AL_x$ according to angle $\theta_x$. Chamfer 458 can be an annular sloped surface and can be considered a frustoconical surface. Chamfer 458 reduces accumulation of leachate along cap 442 during operation of pump cycle counter 410. More specifically, chamfer 458 is sloped to reduce the turbulence of the flow of the liquid over head 236 and downstream beyond head 236 (e.g., into downstream chamber 275). Chamfer 458 does not include sharp corners that can create locations for contaminants to accumulate. In some examples, projection 340 of poppet assembly 322 (FIG. 3) can include an upstream chamfer similar to chamfer 458. The sloped structure of chamfer 458 imparts a radial flow component to the flow of landfill liquid to guide the landfill liquid radially outward around chamfer 458 and head assembly 432 while also imparting an axial flow component to the flow of landfill liquid, allowing landfill liquid to flow radially around head 236 without impinging on the inner surface of chamber wall 276. Advantageously, this structure reduces the turbulence of the flow of liquid from the transition between diameter $D_i$ of inlet throat 262 and diameter Do of chamber wall 276 and thereby reduces contaminate accumulation.

Angle $\theta_x$ is not a right angle (i.e., a 90-degree angles) relative to axis A-A, such that chamfer 258 is sloped relative to the flow axis (coaxial with axis A-A in the depicted example). Advantageously, this geometry eliminates sharp corners at the locations of chamfer 258 on the upstream end of projection 440, reducing turbulence and reducing contaminant accumulation during operation both by reducing or eliminating chokepoints and by reducing contaminate precipitation from turbulent flow. Angles $\theta_x$ can be, for example, 30, 45, or 60 degrees, or any other desired angle for forming a sloped surface to reduce contaminate accumulation during operation.

Poppet assembly 422 is depicted in the closed state in FIG. 5, but it is understood that poppet assembly 422 can transition between closed, intermediate, and open states as described previously with respect to poppet assembly 322 (FIGS. 4A-C). In the closed state, poppet assembly 422 is positioned such that mating surface 250 is positioned adjacent to seat 260 to form mating interface 263. Projection 440 also forms mating interface 464 with inlet throat 262 when poppet assembly 422 is in the closed state. In the example shown, cap 442 radially overlaps with chamber wall 276, seat 260, and inlet throat 262 along the axial extent $AL_{e2}$ of cap 442 when poppet assembly 422 is in the closed state. The upstream end of projection 440 extends upstream of the upstream end of seat 260 in the closed state.

In intermediate states, mating surface 250 is spaced axially from seat 260 (similar to mating surface 350 and seat 360 described with respect to FIGS. 4A-C) and projection 440 continues to form mating interface 464 with inlet throat 262. More specifically, in intermediate states, projection 440 at least partially radially overlaps with inlet throat 262. Similarly, in intermediate states, cap 442 also radially overlaps with chamber wall 276, seat 260, and inlet throat 262 along the axial extent $AL_{e2}$ of cap 442. In some intermediate states, projection 440 radially overlaps with the upstream end of seat 260, but there are intermediate states of poppet assembly 422 in which projection 440 only radially overlaps portions of inlet throat 262 upstream of the upstream end of seat 260.

In the open state, the downstream end of projection 440 is positioned axially downstream of the upstream end of seat 260, such that the projection 340 and inlet throat 262 do not form mating interface 364. Mating surface 250 is also spaced further axially away from seat 260 than in the intermediate states of poppet assembly 422 and mating interface 263 is not formed therebetween. As neither mating interface 263 nor mating interface 464 is formed when poppet assembly 422 is in the open state, liquid is able to flow more freely through pump cycle counter 410 than when pump cycle counter 410 is in the closed or intermediate states. Mating interfaces 263 and 464 inhibit flow of liquid through pump cycle counter 410 when poppet assembly 422 is in the closed and intermediate states, such that appreciable liquid flow occurs only when poppet assembly 422 is in the open state. In the open state, cap 442 radially overlaps with chamber wall 276 and, based on the position of poppet assembly 422, cap 442 can partially radially overlap with seat 260 in the open state. Cap 442 does not radially overlap with inlet throat 262 when poppet assembly 422 is in the open state.

The inclusion of projection 440 requires poppet assembly 322 to move $AL_{p2}$ for liquid to flow liquid past head assembly 332. $AL_{p2}$ is longer than, for example, the axial displacement required to move poppet assembly 222 (FIGS. 2-3C) to the open state, which lacks projection 440 or an equivalent structure. Poppet assembly 422 must translate further axially from the closed state to reach the open state than designs lacking projection 440, advantageously reducing the likelihood that pump cycle counter 310 undercounts the pump cycles of landfill pump 108 (FIG. 1), for the same reasons as described previously with respect to poppet assembly 322 of pump cycle counter 310 (FIGS. 4A-C). The axial length $AL_q$ of projection 440 (and, accordingly the axial length $AL_{e2}$ of cap 442) can be selected based on the desired axial distance between the open and closed states for accurate detection by magnetic sensor 290.

As described previously with respect to poppet assemblies 222, 322, the biasing force provided by spring 272 can be selected to be minimal such that any flow rate of liquid is sufficient to move poppet assembly 422 from the closed state while still allowing spring 272 to move poppet assembly 422 back to the open state after the pump phase of the pump cycle of landfill pump 108 (FIG. 1) has completed. A minimal biasing force provides the substantially the same advantages as articulated with respect to the discussion of poppet assemblies 222, 322.

While cap 442 is shown installed on head 236 in the depicted example, in other examples, cap 442 can be installed on other equivalent and/or suitable poppet head structures having a cavity suitable for receiving cap 442. For example, cap 442 can be installed on an elongated poppet head, such as head 336 of head assembly 332, to further increase the axial displacement required to translate the resultant poppet assembly between open and closed states.

Figure 6:
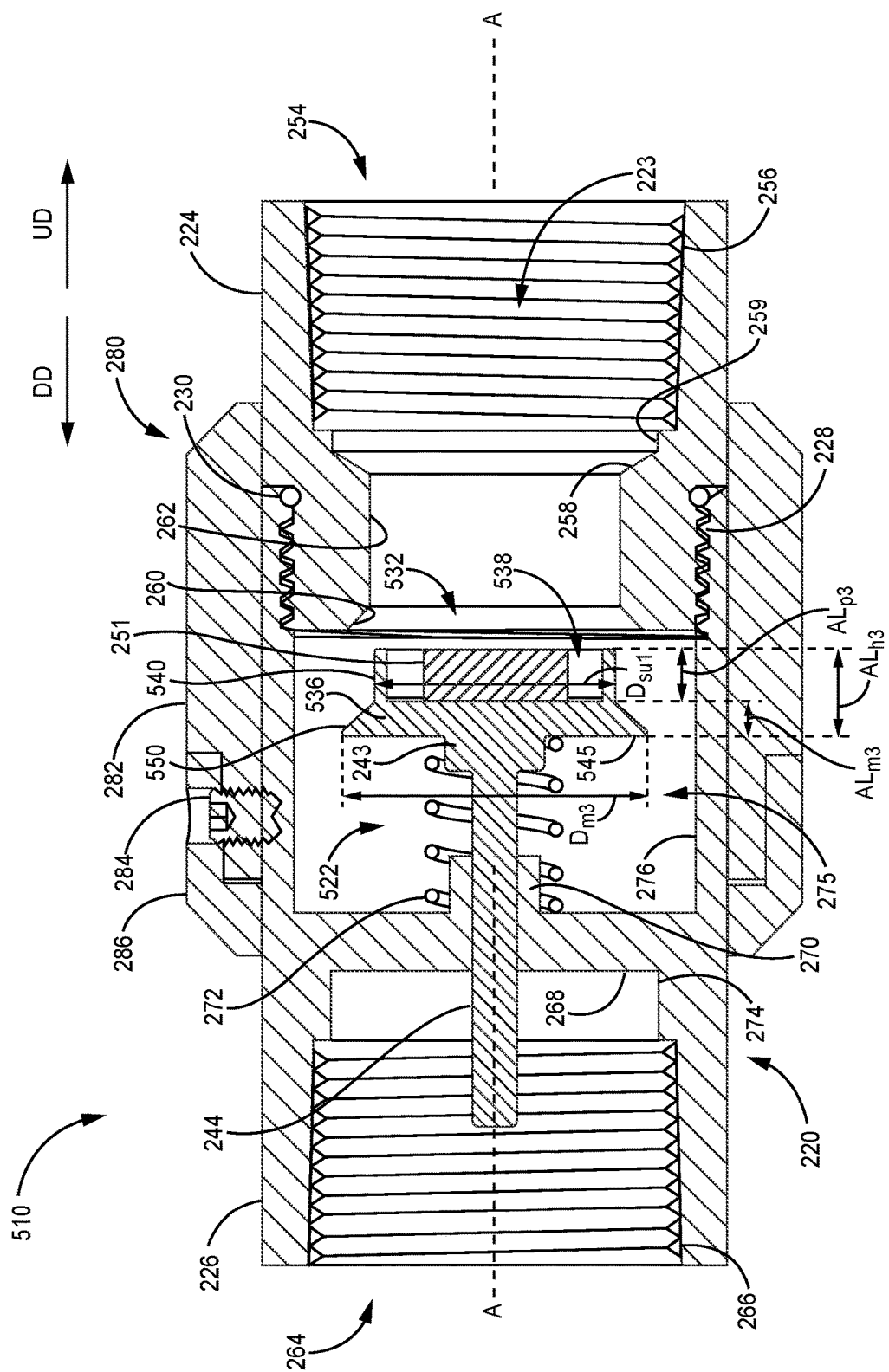
FIG. 6 is a cross-sectional view of yet a further example of a landfill pump cycle counter.

FIG. 6 is a cross-sectional view of pump cycle counter 510, which is a further example of a pump cycle counter including a projecting portion causes a greater axial displacement to the open state, to provide accurate counting of pump cycles. Pump cycle counter 510 is substantially similar to pump cycle counters 210, 310, 410, but includes poppet assembly 522. Poppet assembly 522 is substantially similar to poppet assemblies 222, 322, 422, but includes head 536.

Head 536 includes downstream end 545, mating surface 550, and projection 540. The downstream end 545 of head 536 abuts and is connected to the upstream end of neck 243. Downstream end 545 extends radially with respect to axis A-A and is directly connected to mating surface 550. Mating surface 550 extends in an upstream direction from downstream end 545 and projection 540 extends from the upstream end of mating surface 550. Mating surface 550 can be an annular sloped surface and can be considered a frustoconical surface. The sloped structure of mating surface 550 does not include sharp corners that can create locations for contaminants to accumulate and reduces the turbulence of the flow of landfill liquid around head 536 and to downstream locations of head 536, including downstream chamber 276. Further, the sloped structure of mating surface 550 impart a radial flow component to the flow of landfill liquid to guide the landfill liquid radially outward around mating surface 550 while also imparting an axial flow component to the flow of landfill liquid, thereby reducing turbulence of liquid flow from the transition between diameter $D_i$ of inlet throat 262 and diameter Do of chamber wall 276 and reducing contaminate accumulation.

Projection 540 defines cavity 538, in which magnet 251 is disposed. Head 536 lacks a cap (e.g., one of caps 242, 342, 442). Rather, cavity 538 is sized such that the upstream ends of projection 540 and magnet 251 are radially-aligned or substantially radially aligned. It is understood that each of poppet assemblies 222, 322, 422 do not require a cap. Magnet 251 can be held in cavity 238 by, for example, a pressure-fit arrangement or by an adhesive, among other options. The depicted configuration eliminates sharp edges along the upstream end of head 536 and accordingly reduces contaminate accumulation along the upstream end of head 536. Accordingly, head 536 is one example of a poppet head according to the present disclosure that reduces contaminate accumulation along the upstream end of poppet assembly 522.

Poppet assembly 522 is depicted in the open state in FIG. 6, but it is understood that poppet assembly 522 can transition between closed, intermediate, and open states as described previously with respect to poppet assembly 322 (FIGS. 4A-C). In the closed state, poppet assembly 522 is disposed such that mating surface 550 is adjacent to and forms a mating interface with seat 260 (analogous to mating surfaces 263, 363) and further such that the outer surface of projection 540 forms a mating interface with the inner surface of inlet throat 262 (analogous to mating surfaces 364, 464). In the intermediate state, mating surface 550 is spaced from seat 260 but projection 540 at least partially radially overlaps with inlet throat 262 to form a mating interface that reduces or eliminates flow of liquid across head assembly 532 and into downstream chamber 275. In the open state, the upstream end of projection 540 is positioned downstream of the upstream end of seat 260, such that liquid is able to flow past head assembly 532 and into downstream chamber 275.

Projection 540 has outer diameter $D_{su1}$ such that the outer diameter of projection 540 is substantially the same as the inner diameter of inlet throat 262. Mating surface 550 has diameter $D_{su1}$ on the upstream end of mating surface 550 and diameter $D_{m3}$ on the downstream end of mating surface 550. Poppet head 536 has axial length $AL_{h4}$, projection 540 has axial length $AL_{p3}$ and mating surface 550 has axial length $AL_{m3}$. Head assembly 532 also has axial length $AL_{h4}$.

Mating surface 550 slopes outwardly in a downstream direction DD along axial length $AL_{m3}$ and from diameter $D_{su1}$ to diameter $D_{m3}$, such that the cross-sectional area orthogonal to axis A-A of mating surface 550 increases in a downstream direction DD. Axial length $AL_{m3}$ and diameter $D_{m3}$ are selected such that mating surface 550 slopes at an angle relative to axis A-A that is suitable for forming a mating interface with seat 260. Projection 540 does not slope relative to axis A-A and has a constant diameter along axial length $AL_{p1}$.

Head 536 lacks outer surface 246 and downstream poppet chamfer 248 of poppet heads 236, 336 (FIGS. 3A-4) and mating surface 550 directly abuts and is connected to downstream portion 545. Axial length $AL_{h4}$, accordingly, is shorter than axial lengths $AL_{h1}$, $AL_{h2}$, $AL_{h3}$ of head assemblies 232, 332, 432, respectively. Head 536 and head assembly thereby provides a more compact option and can advantageously reduce the overall size of a pump cycle counter in examples where the pump cycle counter is space-constrained. Head 536 also does not require a cap, which can advantageously reduce the complexity of fabricating head 536.

Pump cycle counters 210, 310, 410, 510 can be made of one or more materials selected to reduce corrosion of the components of pump cycle counters 210, 310, 410, 510 by liquid. For example, some or all components of pump cycle counters 210, 310, 410, 510 can be formed of a stainless steel material. Forming components of pump cycle counters 210, 310, 410, 510 and in particular components exposed to liquids during operation, such as housing 220 and/or components of poppet assemblies 222, 322, 422, 522 exposed to internal passage 223 (i.e., stem 244, neck 243, head 236, head 336, cap 242, cap 342, cap 442, etc.) of a stainless steel material can reduce corrosion of pump cycle counters 210, 310, 410, 510 during normal operation and thereby increase the operational lifespan of the components of pump cycle counters 210, 310, 410, 510. Additionally and/or alternatively, pump cycle counters 210, 310, 410, 510 can be partially or entirely formed of other inert or substantially non-reactive materials, such as one or more polymer materials.

While the components of pump cycle counters 210, 310, 410, 510 have been described generally herein as having cylindrical and/or annular cross-sections along axis A-A, it is understood that pump cycle counters 210, 310, 410, 510 and the components thereof can have any equivalent cross-sectional profile. In some examples, the cylindrical components of pump cycle counters 210, 310, 410, 510 can have substantially elliptical, triangular, or rectangular cross sections, among other options. Additionally and/or alternatively, the annular components of pump cycle counters 210, 310, 410, 510 can be formed to have hollow elliptical, hollow triangular, or hollow rectangular cross sections, among other options. Further, while pump cycle counters 210, 310, 410, 510 have been described herein as extending generally linearly, such that inlet 254 and outlet 264 are centered on axis A-A, in other examples, pump cycle counters 210, 310, 410, 510 can include one more elbows, kinks, or other equivalent non-linear elements.

Similarly, while chamfers 258, 263, 363, 458 have been described as chamfers herein having a continuous and unbroken surface at a constant angle relative axis A-A, in other examples chamfers 258, 263, 363, 458 can be an equivalent contoured or shaped surface for reducing contaminant accumulation. In some examples, chamfers 258, 263, 363, 458 can be rounded or have other contouring and/or shaping features for reducing contaminant accumulation. Similarly, while mating surfaces 250, 350, 550 and seats 260, 360 have been described and shown as continuous and unbroken surfaces having constant angles relative to axis A-A, each of mating surfaces 250, 350, 550 and seats 260, 360 can be an equivalent contoured or shaped surface for reducing contaminant accumulation. For example, any or all of mating surfaces 250, 350, 550 and seats 260, 360 can be rounded or have other contouring and/or shaping features for reducing contaminant accumulation. Inlet housing 224 and outlet housing 226 are generally described herein as separate housing elements of housing 220 of pump cycle counters 210, 310, 410, 510 that are connected by threaded interface 228, but in other examples, inlet housing 224 and outlet housing 226 can be a single housing element that does not include, for example, threaded interface 228 or seal 230. For example, inlet housing 224 and outlet housing 226 can be a monolithic element. Further, any feature, element, and/or component of any example of any embodiment described herein can be combined with the features, elements, and/or components of any other embodiment described herein.

The landfill pump cycle counters described herein provide various chamfers and other angled features that reduce contaminant accumulation during operation along an evacuation line of a landfill pump system while allowing the landfill pump cycle counters to accurately count measure the presence or absence of leachate flow from the landfill pump. As explained herein, the presence or absence of flow of liquid from a landfill pump can be used to determine the phase of the pump cycle that the landfill pump and, accordingly, repeated measurement of the presence or absence of fluid flow can be used to count the number of pump cycles performed by the landfill pump. The landfill pump cycle counters described herein can also be formed of various corrosion-resistant materials, such as stainless steel, to reduce corrosion-based wear from liquid during operation.

DISCUSSION OF POSSIBLE EMBODIMENTS

The following are non-exclusive descriptions of possible embodiments of the present invention.

An embodiment of a landfill pump check valve configured to regulate liquid output from a landfill pump includes a housing, the housing extending along an axis and defining an inlet, an outlet, and an internal passage, the internal passage fluidly connecting the inlet to the outlet, a poppet disposed within the internal passage and configured to be moved axially between an open state and a closed state, a seat formed on an inner surface of the housing, and a mating surface formed on the poppet and configured to form a first mating interface with the seat of the housing when the poppet is in the closed state.

The landfill pump check valve of the preceding paragraph can optionally include, additionally and/or alternatively, any one or more of the following features, configurations and/or additional components:

A landfill pump check valve configured to regulate liquid output from a landfill pump according to an exemplary embodiment of this disclosure, among other possible things includes a housing, the housing extending along an axis and defining an inlet, an outlet, and an internal passage, the internal passage fluidly connecting the inlet to the outlet, a poppet disposed within the internal passage and configured to be moved axially between an open state and a closed state, a seat formed on an inner surface of the housing, and a mating surface formed on the poppet and configured to form a first mating interface with the seat of the housing when the poppet is in the closed state.

An embodiment of a landfill pump cycle counter configured to receive liquid output from a landfill pump includes a housing, the housing extending along an axis and defining an inlet, an outlet, and an internal passage, the internal passage fluidly connecting the inlet to the outlet, a poppet disposed within the internal passage and configured to be moved axially between an open state and a closed state, a seat formed on an inner surface of the housing, a mating surface formed on the poppet and configured to form a first mating interface with the seat of the housing when the poppet is in the closed state, and a projection formed on an upstream end of the poppet, the projection extending in an upstream direction away from an upstream end of the mating surface and configured to form a second mating interface with an inner surface of the housing when the poppet is in the closed state.

The landfill pump cycle counter of the preceding paragraph can optionally include, additionally and/or alternatively, any one or more of the following features, configurations and/or additional components:

A landfill pump cycle counter configured to receive liquid output from a landfill pump according to an exemplary embodiment of this disclosure, among other possible things includes a housing, the housing extending along an axis and defining an inlet, an outlet, and an internal passage, the internal passage fluidly connecting the inlet to the outlet, a poppet disposed within the internal passage and configured to be moved axially between an open state and a closed state, a seat formed on an inner surface of the housing, a mating surface formed on the poppet and configured to form a first mating interface with the seat of the housing when the poppet is in the closed state, and a projection formed on an upstream end of the poppet, the projection extending in an upstream direction away from an upstream end of the mating surface and configured to form a second mating interface with an inner surface of the housing when the poppet is in the closed state.

An embodiment of a landfill pump cycle counter configured to receive liquid output from a landfill pump includes a housing, the housing extending along an axis and defining an inlet, an outlet, and an internal passage, the internal passage fluidly connecting the inlet to the outlet a poppet disposed within the internal passage and configured to be moved axially between an open state and a closed state, the poppet comprising an internal cavity comprising an opening at an axially-upstream end of a poppet head of the poppet, and a cap attached to the poppet head, the cap at least partially covering the opening. The landfill pump cycle counter further includes a seat formed on an inner surface of the housing, a mating surface formed on the poppet and configured to form a first mating interface with the seat of the housing when the poppet is in the closed state, and a projection formed on an upstream end of the cap, the projection extending in an upstream direction away from an upstream end of the mating surface and configured to form a second mating interface with an inner surface of the housing when the poppet is in the closed state.

The landfill pump cycle counter of the preceding paragraph can optionally include, additionally and/or alternatively, any one or more of the following features, configurations and/or additional components:

A landfill pump cycle counter configured to receive liquid output from a landfill pump according to an exemplary embodiment of this disclosure, among other possible things includes a housing, the housing extending along an axis and defining an inlet, an outlet, and an internal passage, the internal passage fluidly connecting the inlet to the outlet a poppet disposed within the internal passage and configured to be moved axially between an open state and a closed state, the poppet comprising an internal cavity comprising an opening at an axially-upstream end of a poppet head of the poppet, and a cap attached to the poppet head, the cap at least partially covering the opening. The landfill pump cycle counter further includes a seat formed on an inner surface of the housing, a mating surface formed on the poppet and configured to form a first mating interface with the seat of the housing when the poppet is in the closed state, and a projection formed on an upstream end of the cap, the projection extending in an upstream direction away from an upstream end of the mating surface and configured to form a second mating interface with an inner surface of the housing when the poppet is in the closed state.

An embodiment of a landfill pump cycle counter configured to receive liquid output from a landfill pump includes a housing, the housing extending along an axis and defining an inlet, an outlet, and an internal passage, the internal passage fluidly connecting the inlet to the outlet, a seat disposed within the housing, and a poppet disposed within the internal passage, the poppet comprising, a guide and a head disposed at an upstream end of the guide, a mating surface formed on a downstream end of the head, such that the downstream end of the mating surface abuts the upstream end of the guide, the mating surface configured to form a first mating interface with the seat of the housing when the poppet is in the closed state, a projection formed on an upstream end of the mating surface, the projection extending in an upstream direction and configured to form a second mating interface with an inner surface of the housing when the poppet is in the closed state, an internal cavity defined by the projection, and a magnet disposed within the internal cavity.

The landfill pump cycle counter of the preceding paragraph can optionally include, additionally and/or alternatively, any one or more of the following features, configurations and/or additional components:

A landfill pump cycle counter configured to receive liquid output from a landfill pump according to an exemplary embodiment of this disclosure, among other possible things includes a housing, the housing extending along an axis and defining an inlet, an outlet, and an internal passage, the internal passage fluidly connecting the inlet to the outlet, a seat disposed within the housing, and a poppet disposed within the internal passage, the poppet comprising, a guide and a head disposed at an upstream end of the guide, a mating surface formed on a downstream end of the head, such that the downstream end of the mating surface abuts the upstream end of the guide, the mating surface configured to form a first mating interface with the seat of the housing when the poppet is in the closed state, a projection formed on an upstream end of the mating surface, the projection extending in an upstream direction and configured to form a second mating interface with an inner surface of the housing when the poppet is in the closed state, an internal cavity defined by the projection, and a magnet disposed within the internal cavity.

An embodiment of a landfill pump cycle counter configured to receive liquid output from a landfill pump includes a housing, the housing extending along an axis and defining an inlet, an outlet, and an internal passage, the internal passage fluidly connecting the inlet to the outlet, a poppet disposed within the internal passage, the poppet comprising an internal cavity and configured to be moved axially between an open state and a closed state, a magnet disposed within the internal cavity of the poppet, a counter mounted to the housing, the counter including a magnetic sensor, the magnetic sensor configured to detect a poppet cycle, the poppet cycle including the poppet moving from one of the open state and the closed state to the other of the open state and the closed state, a seat disposed within the housing, and a mating surface formed on the poppet and configured to form a first mating interface with the seat of the housing when the poppet is in the closed state.

The landfill pump cycle counter of the preceding paragraph can optionally include, additionally and/or alternatively, any one or more of the following features, configurations and/or additional components:

A landfill pump cycle counter configured to receive liquid output from a landfill pump according to an exemplary embodiment of this disclosure, among other possible things includes a housing, the housing extending along an axis and defining an inlet, an outlet, and an internal passage, the internal passage fluidly connecting the inlet to the outlet, a poppet disposed within the internal passage, the poppet comprising an internal cavity and configured to be moved axially between an open state and a closed state, a magnet disposed within the internal cavity of the poppet, a counter mounted to the housing, the counter including a magnetic sensor, the magnetic sensor configured to detect a poppet cycle, the poppet cycle including the poppet moving from one of the open state and the closed state to the other of the open state and the closed state, a seat disposed within the housing, and a mating surface formed on the poppet and configured to form a first mating interface with the seat of the housing when the poppet is in the closed state.

A further embodiment of the foregoing landfill pump cycle counter, wherein the inlet and the outlet define a flow direction from an upstream end at the inlet to a downstream end at the outlet.

A further embodiment of any of the foregoing landfill pump cycle counters, wherein the housing comprises a first housing and a second housing, the first housing defines the inlet, and the second housing defines the outlet.

A further embodiment of any of the foregoing landfill pump cycle counters, wherein the first housing defines a throat downstream of the inlet, the throat upstream of the seat, the first housing has a first diameter at the inlet, the first housing has a second diameter at the throat, and the first diameter is greater than the second diameter.

A further embodiment of any of the foregoing landfill pump cycle counters, wherein the first housing further defines a chamfer upstream of the throat, the chamfer sloped such that the diameter of the housing decreases from the first diameter to the second diameter in the downstream direction along the chamfer.

A further embodiment of any of the foregoing landfill pump cycle counters, wherein the poppet comprises a head and a guide, the mating surface formed on the head, and the second housing comprises a chamber wall that defines a chamber of the internal passage, a rib downstream of the chamber wall, and a poppet support to receive the guide, the poppet support aligning the poppet on the axis and supporting the poppet such that the poppet can shift axially relative to the poppet support between the open state and the closed state.

A further embodiment of any of the foregoing landfill pump cycle counters, wherein the mating surface is sloped relative to the axis, such that the mating surface has a third diameter at an upstream end of the mating surface and a fourth diameter at a downstream end of the mating surface, the fourth diameter greater than the third diameter.

A further embodiment of any of the foregoing landfill pump cycle counters, wherein the seat is sloped relative to the axis, such that the seat has a fifth diameter at an upstream end of the seat and a sixth diameter at the downstream end of the seat, the sixth diameter greater than the fifth diameter.

A further embodiment of any of the foregoing landfill pump cycle counters, wherein the mating surface extends a first axial length and the seat extends a second axial length, wherein the first axial length the same as or greater than the second axial length.

A further embodiment of any of the foregoing landfill pump cycle counters, wherein the mating surface extends at a first angle, the first angle taken between the axis and a line extending outwardly from the axis and tangential to the mating surface relative to the axis.

A further embodiment of any of the foregoing landfill pump cycle counters, wherein the leachate liquid comprises contaminate and the first angle is selected to reduce accumulation of contaminate on the head of the poppet during operation of the landfill pump cycle counter.

A further embodiment of any of the foregoing landfill pump cycle counters, wherein the seat extends at a second angle, the second angle taken between the axis and a line extending outwardly from the axis and tangential to the mating surface relative to the axis.

A further embodiment of any of the foregoing landfill pump cycle counters, wherein the second angle is selected to reduce accumulation of contaminate on the inner surface of the housing during operation of the landfill pump cycle counter.

A further embodiment of any of the foregoing landfill pump cycle counters, wherein the first angle and the second angle are the same.

A further embodiment of any of the foregoing landfill pump cycle counters, wherein the third diameter is equal to the fifth diameter and the fourth diameter is equal to the sixth diameter.

A further embodiment of any of the foregoing landfill pump cycle counters, wherein the first axial length is equal to the second axial length.

A further embodiment of any of the foregoing landfill pump cycle counters, wherein the head comprises a downstream chamfer on a downstream end of the head.

A further embodiment of any of the foregoing landfill pump cycle counters, wherein the downstream chamfer is sloped relative to the axis.

A further embodiment of any of the foregoing landfill pump cycle counters, wherein the downstream chamfer has a seventh diameter at an upstream end of the downstream chamfer and an eight diameter at the upstream end of the downstream chamfer, the seventh diameter greater than the eighth diameter.

A further embodiment of any of the foregoing landfill pump cycle counters, wherein the downstream chamfer has a third axial length.

A further embodiment of any of the foregoing landfill pump cycle counters, wherein the downstream chamfer extends at a third angle, the third angle taken between the axis and a line extending outwardly from the axis and tangential to the mating surface relative to the axis.

A further embodiment of any of the foregoing landfill pump cycle counters, wherein the third angle is selected to reduce accumulation of contaminate on the head of the poppet during operation of the landfill pump cycle counter.

A further embodiment of any of the foregoing landfill pump cycle counters, and further comprising a projection disposed upstream of the mating surface.

A further embodiment of any of the foregoing landfill pump cycle counters, wherein the projection is configured to form a second mating interface with the inner surface of the housing when the poppet is in the closed state.

A further embodiment of any of the foregoing landfill pump cycle counters, wherein, when the poppet is in the open state, the mating surface does not form the first mating interface with the seat and the projection does not form the second mating interface with the inner surface of the housing.

A further embodiment of any of the foregoing landfill pump cycle counters, wherein, when the poppet is in a state intermediate to the closed state and the open state, the projection forms the second mating interface with the inner surface of the housing and the mating surface is spaced from the seat such that the mating surface does not form the first mating interface with the seat.

A further embodiment of any of the foregoing landfill pump cycle counters, wherein a radially-outer surface of the projection is configured to form the second mating interface with the inner surface of the housing.

A further embodiment of any of the foregoing landfill pump cycle counters, wherein the inner surface of the housing is an inner surface of the first housing.

A further embodiment of any of the foregoing landfill pump cycle counters, wherein the projection is configured to form a second mating interface with an inner surface of the throat.

A further embodiment of any of the foregoing landfill pump cycle counters, wherein the head comprises the projection.

A further embodiment of any of the foregoing landfill pump cycle counters, wherein the projection extends from the upstream end of the mating surface.

A further embodiment of any of the foregoing landfill pump cycle counters, wherein the projection is formed on an upstream end of a cap connected to the head to enclose the internal cavity.

A further embodiment of any of the foregoing landfill pump cycle counters, wherein the projection is a hollow cylinder.

A further embodiment of any of the foregoing landfill pump cycle counters, wherein the mating surface is annular.

A further embodiment of any of the foregoing landfill pump cycle counters, wherein the seat is annular.

A further embodiment of any of the foregoing landfill pump cycle counters, and further comprising a second chamfer formed on an upstream end of the projection.

A further embodiment of any of the foregoing landfill pump cycle counters, wherein the second chamfer is sloped relative to the axis, such that the second chamfer has a ninth diameter at an upstream end of the chamfer and a tenth diameter at the downstream end of the chamfer, the tenth diameter greater than the ninth diameter.

A further embodiment of any of the foregoing landfill pump cycle counters, wherein the second chamfer extends a fourth axial length.

A further embodiment of any of the foregoing landfill pump cycle counters, wherein the second chamfer extends at a fourth angle, the fourth angle taken between the axis and a line extending outwardly from the axis and tangential to the mating surface relative to the axis.

A further embodiment of any of the foregoing landfill pump cycle counters, wherein the fourth angle is selected to reduce accumulation of contaminate on the projection during operation of the landfill pump cycle counter.

A further embodiment of any of the foregoing landfill pump cycle counters, wherein the second mating interface extends from the downstream end of the second chamfer to the downstream end of the projection when the poppet is in the closed state.

A further embodiment of any of the foregoing landfill pump cycle counters, wherein the projection at least partially radially overlaps with the throat when the poppet is in the state intermediate to the open and closed states.

A further embodiment of any of the foregoing landfill pump cycle counters, wherein the projection radially overlaps with the throat at all axial positions of the projection when the poppet is in the closed state.

A further embodiment of any of the foregoing landfill pump cycle counters, wherein the first mating interface is configured to reduce flow of landfill liquid through the landfill pump cycle counter.

A further embodiment of any of the foregoing landfill pump cycle counters, wherein the second mating interface is configured to reduce flow of landfill liquid through the landfill pump cycle counter.

A further embodiment of any of the foregoing landfill pump cycle counters, wherein the internal passage has a tenth diameter upstream of the seat and an eleventh diameter downstream of the seat, and the eleventh diameter is larger than the tenth diameter.

A further embodiment of any of the foregoing landfill pump cycle counters, wherein the chamber has a twelfth diameter.

A further embodiment of any of the foregoing landfill pump cycle counters, wherein the twelfth diameter is greater than the second diameter.

A further embodiment of any of the foregoing landfill pump cycle counters, wherein a maximum diameter of the poppet is greater than the second diameter and less than the twelfth diameter.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A landfill pump cycle counter configured to receive liquid output from a landfill pump, the landfill pump cycle counter comprising:
   a housing, the housing comprising a poppet support and extending along an axis and defining an inlet, an outlet, and an internal passage, the internal passage fluidly connecting the inlet to the outlet;
   a poppet disposed within the internal passage, the poppet configured to be moved axially relative to the poppet support and between an open state and a closed state, the poppet comprising:
      an internal cavity;
      a guide extending through the poppet support such that the guide extends both upstream from the poppet support and downstream from the poppet support with the poppet in both the open state and the closed state; and
      a poppet head disposed upstream of the guide;
   a magnet disposed within the internal cavity of the poppet;
   a counter including a magnetic sensor, the magnetic sensor configured to detect a poppet cycle, the poppet cycle including the poppet moving from one of the open state and the closed state to the other of the open state and the closed state;
   a seat formed on an inner surface of the housing; and
   a mating surface formed on the poppet and configured to form a first mating interface with the seat of the housing when the poppet is in the closed state.

2. The landfill pump cycle counter of claim 1, wherein the poppet cycle includes the poppet moving from the closed state to the open state and the poppet moving back to the closed state from the open state.

3. The landfill pump cycle counter of claim 1, wherein at least one of the poppet and the housing is formed at least partially of stainless steel.

4. The landfill pump cycle counter of claim 1, wherein the poppet head further comprises a projection that extends in an upstream direction from an upstream end of the mating surface.

5. The landfill pump cycle counter of claim 4, wherein
   an axially-upstream end of the projection is disposed upstream of the upstream end of the seat with the poppet is in the closed state; and
   the projection radially overlaps with the upstream end of the seat with the poppet in a position intermediate to the closed state and the open state.

6. The landfill pump cycle counter of claim 4, wherein an outer radial surface of the projection is configured to form a second mating interface with a portion of the inner surface of the housing disposed upstream of the seat when the poppet is in the closed state.

7. The landfill pump cycle counter of claim 6, wherein the outer radial surface of the projection is configured to form the second mating interface with the portion of the inner surface of the housing when the poppet is in a position intermediate the closed state and the open state.

8. The landfill pump cycle counter of claim 1, wherein:
   the internal cavity is disposed within the poppet head; and
   the mating surface is formed on the poppet head.

9. The landfill pump cycle counter of claim 8, wherein:
   the internal cavity of the poppet comprises an opening at an axially-upstream end of the poppet head; and
   the poppet further comprises a cap attached to the internal cavity, the cap at least partially covering the opening.

10. The landfill pump cycle counter of claim 9, wherein:
    the cap comprises a projection that disposed upstream of an upstream end of the mating surface;
    an axially-upstream end of the projection is disposed upstream of the upstream end of the seat with the poppet is in the closed state; and
    an outer surface of the projection is configured to form a second mating interface with a portion of the inner surface of the housing disposed upstream of the seat.

11. The landfill pump cycle counter of claim 1, wherein:
    the mating surface has a first diameter at a downstream end of the mating surface and a second diameter at an upstream end of the mating surface; and
    the first diameter is larger than the second diameter.

12. The landfill pump cycle counter of claim 11, wherein:
    the seat has a third diameter at the downstream end of the seat and a fourth diameter at an upstream end of the seat; and
    the third diameter is larger than the fourth diameter.

13. The landfill pump cycle counter of claim 1, wherein
    the mating surface extends at a first angle, the first angle taken between the axis and a line extending outwardly from the axis and tangential to the mating surface;
    the seat extends at a second angle, the second angle taken between the axis and a line extending outwardly from the axis and tangential to the seat; and
    the first angle is equal to the second angle.

14. The landfill pump cycle counter of claim 1, and further comprising a spring biasing the poppet towards the closed state.

15. The landfill pump cycle counter of claim 1, wherein:
    the housing comprises a first housing and a second housing;
    the poppet comprises a guide and a poppet head disposed at an upstream end of the guide;
    the first housing defines the inlet;
    the first housing includes the seat;
    the second housing defines the outlet; and
    the second housing comprises a poppet support structured to receive the guide, the poppet support aligning the poppet on the axis and supporting the poppet such that the poppet can shift axially relative to the poppet support between the open state and the closed state.

16. The landfill pump cycle counter of claim 1, wherein the poppet comprises a guide and a poppet head disposed at an upstream end of the guide, and further comprising a chamfer formed between a downstream end of the poppet head and an outer radial surface of the poppet head, the chamfer having a first diameter at an upstream end of the chamfer and a second diameter at a downstream end of the chamfer, the first diameter larger than the second diameter.

17. The landfill pump cycle counter of claim 1, wherein:
    the internal passage has a first diameter upstream of the seat and a second diameter downstream of the seat;
    the poppet head has a third diameter;
    the second diameter is greater than the first diameter;
    the second diameter is greater than the third diameter; and
    the third diameter is greater than the first diameter.

18. The landfill pump cycle counter of claim 1, wherein:
the poppet extends along and is centered on a poppet axis;
the inlet extends along and is centered on a flow axis;
the outlet extends along and is centered on the flow axis; and
the poppet axis is coaxial with the flow axis.

19. A landfill pump system comprising:
a pneumatic landfill pump configured to be at least partially submerged in a landfill well, the pneumatic landfill pump configured to pump liquid from the landfill well along an evacuation line fluidly connected to the pneumatic landfill pump;
an air source pneumatically connected to the pneumatic landfill pump, the air source configured to supply compressed air to the pneumatic landfill pump to cause pumping by the pneumatic landfill pump; and
the landfill pump cycle counter of claim 1 connected to the evacuation line, such that the landfill pump cycle counter receives the liquid pumped through the evacuation line by the pneumatic landfill pump.

20. A method of counting landfill pump cycles, the method comprising:
pumping liquid from a landfill pump to a landfill pump cycle counter;
moving a poppet of the landfill pump cycle counter from a closed state to an open state with a flow of liquid, wherein the poppet includes a magnet and a guide that is disposed at least partially within and engaged with a poppet support while the poppet moves from a closed state to an open state, the guide moving relative to the poppet support;
detecting that the poppet has moved from the closed state to the open state with a magnetic sensor configured to detect a magnetic field of the magnet;
stopping the flow of liquid from the landfill pump to the landfill pump cycle counter;
moving the poppet of the landfill pump cycle counter from the open state to the closed state with a spring, wherein the guide extends through the poppet support such that the guide projects downstream from the spring in both the open state and the closed state;
detecting that the poppet has moved from the open state back to the closed state with the magnetic sensor; and
incrementing a cycle count by the landfill pump cycle counter after the poppet has moved from the open state back to the closed state.

21. A landfill pump cycle counter configured to receive liquid output from a landfill pump, the landfill pump cycle counter comprising:
a housing, the housing extending along an axis and defining an inlet, an outlet, and an internal passage, the internal passage fluidly connecting the inlet to the outlet;
a poppet disposed within the internal passage, the poppet configured to be moved axially between an open state and a closed state, the poppet comprising a poppet head, the poppet head comprising an internal cavity extending into the poppet head from an opening at an axially upstream end of the poppet head;
a magnet disposed within the internal cavity of the poppet;
a counter including a magnetic sensor, the magnetic sensor configured to detect a poppet cycle, the poppet cycle including the poppet moving from one of the open state and the closed state to the other of the open state and the closed state;
a seat formed on an inner surface of the housing; and
a mating surface formed on the poppet head and configured to form a first mating interface with the seat of the housing when the poppet is in the closed state.

* * * * *